(12) United States Patent
Tanaka et al.

(10) Patent No.: US 9,013,805 B2
(45) Date of Patent: Apr. 21, 2015

(54) ZOOM LENS AND IMAGING APPARATUS

(71) Applicant: FUJIFILM Corporation, Tokyo (JP)

(72) Inventors: Takashi Tanaka, Saitama-ken (JP); Michio Cho, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/314,050

(22) Filed: Jun. 25, 2014

(65) Prior Publication Data

US 2014/0307320 A1 Oct. 16, 2014

Related U.S. Application Data

(63) Continuation of application No. PCT/JP2012/008256, filed on Dec. 25, 2012.

(30) Foreign Application Priority Data

Dec. 27, 2011 (JP) ................................. 2011-284628

(51) Int. Cl.
| | |
|---|---|
| *G02B 15/14* | (2006.01) |
| *G02B 15/16* | (2006.01) |
| *G02B 15/173* | (2006.01) |
| *G02B 13/00* | (2006.01) |
| *G02B 27/64* | (2006.01) |

(52) U.S. Cl.
CPC .............. *G02B 15/16* (2013.01); *G02B 15/173* (2013.01); *G02B 13/009* (2013.01); *G02B 27/646* (2013.01)

(58) Field of Classification Search
CPC .................................................... G02B 15/173
USPC ................................................ 359/676–687
See application file for complete search history.

(56) References Cited

U.S. PATENT DOCUMENTS

| 4,492,437 | A | | 1/1985 | Masumoto et al. | |
|---|---|---|---|---|---|
| 4,618,219 | A | * | 10/1986 | Sugiura et al. | ................ 359/688 |
| 4,871,239 | A | | 10/1989 | Masumoto et al. | |

(Continued)

FOREIGN PATENT DOCUMENTS

| JP | 57-78514 | 5/1982 |
|---|---|---|
| JP | 58-137812 | 8/1983 |

(Continued)

OTHER PUBLICATIONS

International Search Report PCT/JP2012/008256 dated Apr. 23, 2013.

*Primary Examiner* — Scott J Sugarman
*Assistant Examiner* — Jeffrey Madonna
(74) *Attorney, Agent, or Firm* — Young & Thompson

(57) ABSTRACT

A zoom lens substantially consists of a positive first lens group, a negative second lens group, a positive third lens group, and a positive fourth lens group in this order from the object side, wherein the distance between the first lens group and the second lens group increases and the distance between the second lens group and the third lens group decreases, and the distance between the third lens group and the fourth lens group decreases while changing magnification. The fourth lens group substantially consists of a positive fourth-a lens group composed of a biconvex-shape lens, a negative meniscus-shape lens, and a biconvex-shape lens and a negative fourth-b lens group composed of a positive meniscus-shape lens and a biconcave-shape lens in this order from the object side, and only the fourth-b lens group is moved toward the image side while focusing.

11 Claims, 14 Drawing Sheets

(56) References Cited

U.S. PATENT DOCUMENTS

| | | | |
|---|---|---|---|
| 4,995,707 A | 2/1991 | Hashimoto | |
| 5,731,897 A * | 3/1998 | Suzuki | 359/557 |
| 5,870,231 A | 2/1999 | Takada | |
| 6,266,195 B1 * | 7/2001 | Shinohara | 359/686 |
| 6,324,018 B1 | 11/2001 | Kawamura | |
| 6,661,458 B1 | 12/2003 | Takada et al. | |
| 7,672,063 B2 | 3/2010 | Take | |
| 2009/0086321 A1* | 4/2009 | Mizuguchi et al. | 359/557 |
| 2009/0135498 A1* | 5/2009 | Take | 359/684 |
| 2009/0207501 A1* | 8/2009 | Yokoyama | 359/684 |
| 2010/0194969 A1* | 8/2010 | Sakamoto | 348/345 |
| 2011/0157719 A1* | 6/2011 | Yoneyama | 359/684 |
| 2011/0286108 A1 | 11/2011 | Take | |

FOREIGN PATENT DOCUMENTS

| | | |
|---|---|---|
| JP | 62-078523 | 4/1987 |
| JP | 63-294506 | 12/1988 |
| JP | 01-185608 | 7/1989 |
| JP | 03-11314 | 1/1991 |
| JP | 04-96012 | 3/1992 |
| JP | 09-5629 | 1/1997 |
| JP | 09-33808 | 2/1997 |
| JP | 2000-275523 | 10/2000 |
| JP | 2001-111872 | 4/2001 |
| JP | 2009-009104 | 1/2009 |
| JP | 2009-115874 | 5/2009 |
| JP | 2010-145759 | 7/2010 |
| JP | 2010-169983 | 8/2010 |

* cited by examiner

FIG.1
EXAMPLE 1
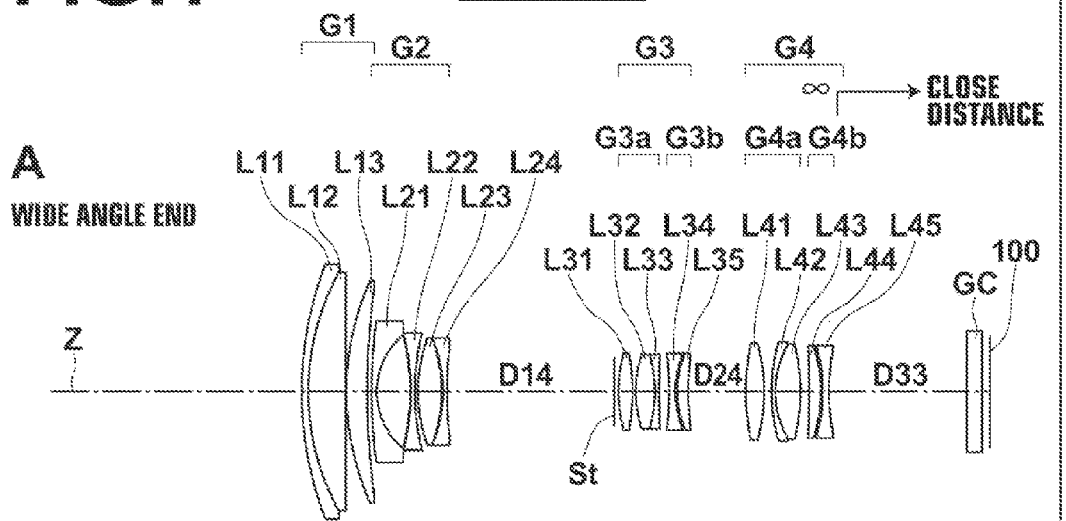
A WIDE ANGLE END
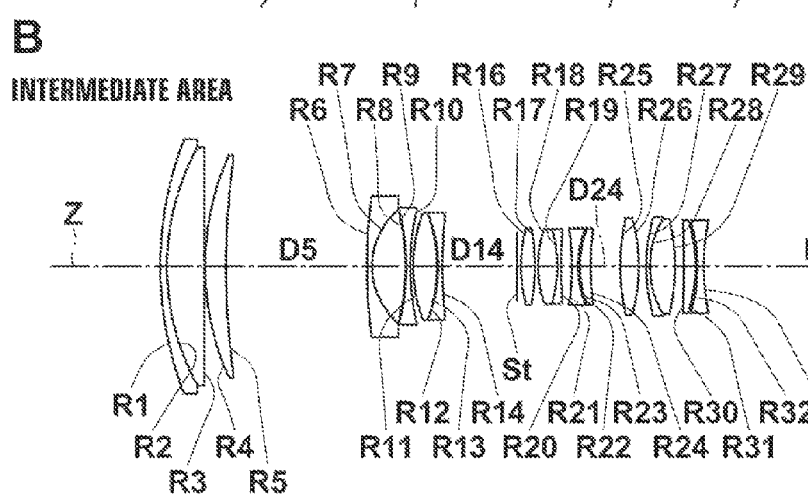
B INTERMEDIATE AREA
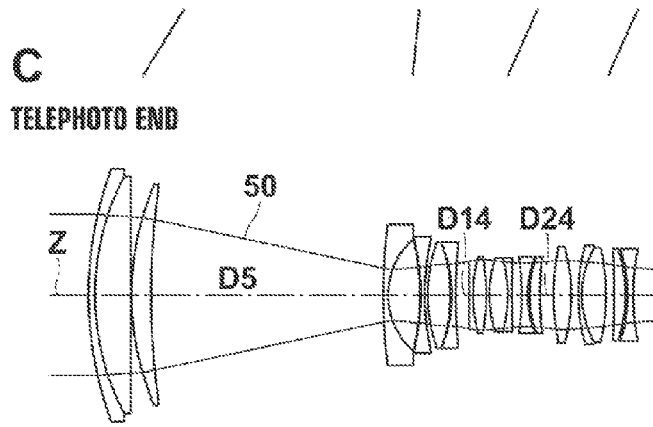
C TELEPHOTO END

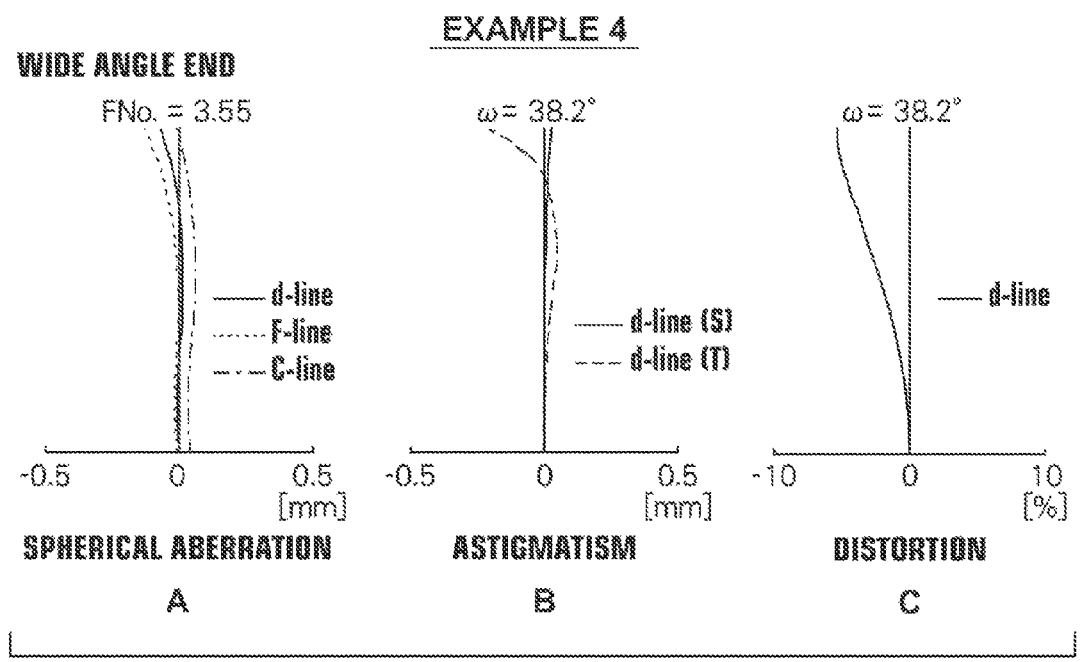
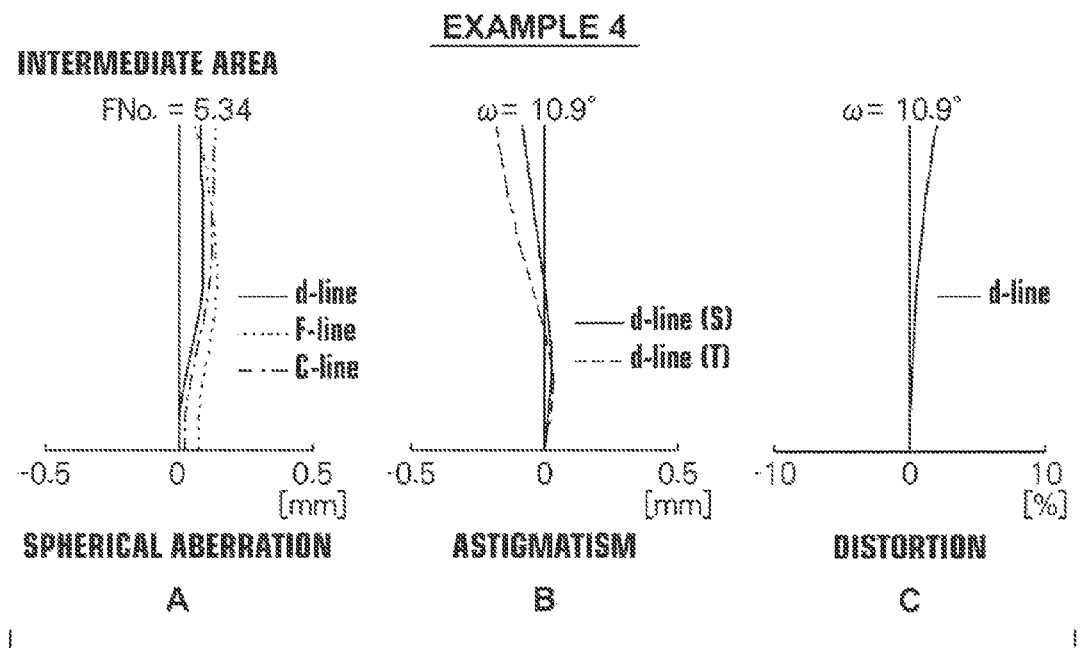

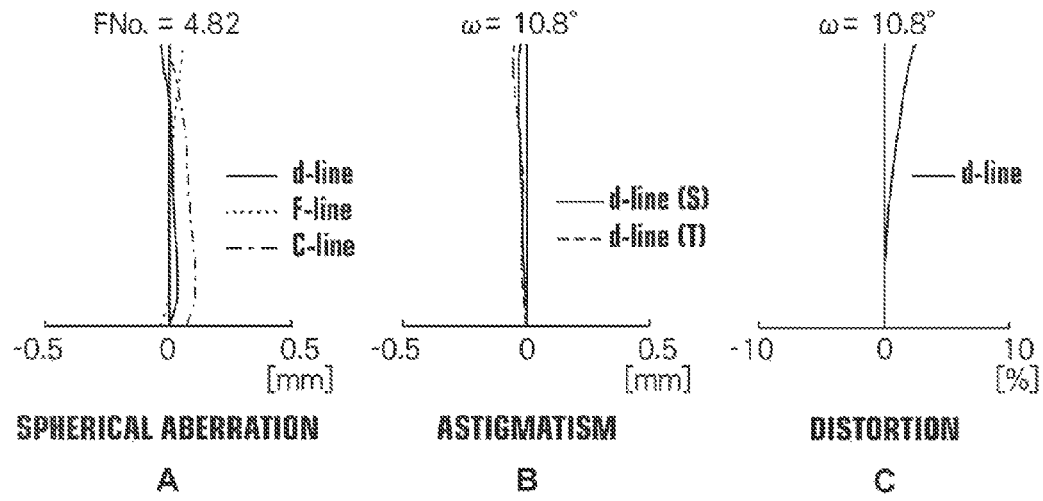
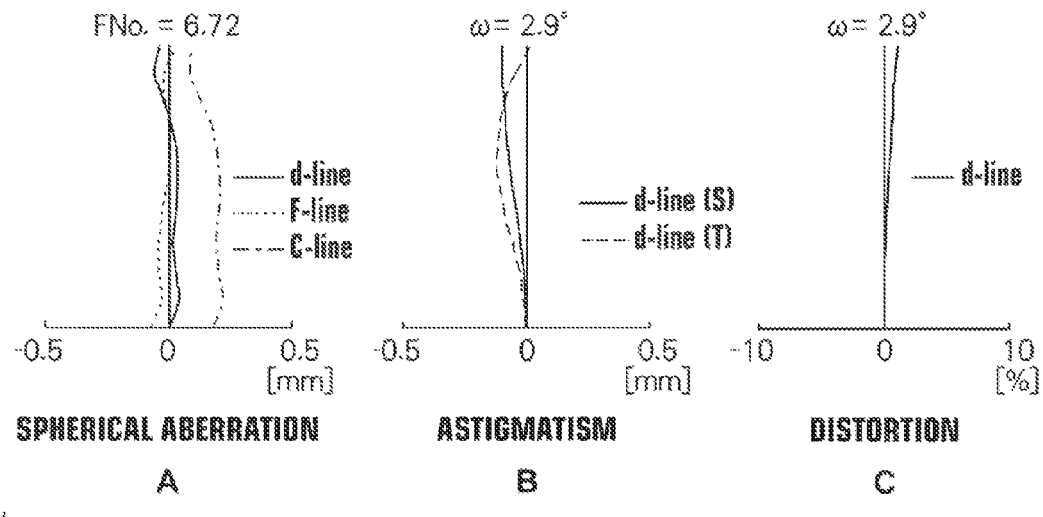

ZOOM LENS AND IMAGING APPARATUS

CROSS-REFERENCE TO RELATED APPLICATIONS

This application is a Continuation of PCT International Application No. PCT/JP2012/008256 filed on Dec. 25, 2012, which claims priority under 35 U.S.C. §119(a) to Japanese Patent Application No. 2011-284628 filed Dec. 27, 2011. Each of the above application(s) is hereby expressly incorporated by reference, in its entirety, into the present application.

BACKGROUND OF THE INVENTION

1. Technical Field

The present invention relates to a zoom lens used in electronic cameras such as a digital camera, a video camera, a broadcasting camera, a movie camera, a surveillance camera, and the like, and to an imaging apparatus including the zoom lens.

2. Description of the Related Art

Conventionally, zoom lenses of a four group configuration, in which a fourth lens group is constituted by a fourth-a lens group and a fourth-b lens group and focus is performed by moving the fourth-b lens group on the rear side, have been proposed (Japanese Unexamined Patent Publication No. 2009-009104 and Japanese Unexamined Patent Publication No. 2009-115874) in order to achieve miniaturization and suppress the sensitivity of movement of an image associated with focusing movements in zoom lenses having high zoom ratios.

SUMMARY OF THE INVENTION

In the zoom lenses disclosed in Japanese Unexamined Patent Publication No. 2009-009104 and Japanese Unexamined Patent Publication No. 2009-115874, the fourth-b lens group is moved toward the object side while focusing from infinity to a close distance because the fourth-b lens group for focusing has positive refractive power. Thereby, a space for moving the fourth-b lens group is required on the object side of the fourth-b lens group, and as the result thereof, a large space is required between the fourth-a lens group and the fourth-b lens group. This does not allow the optical system to be sufficiently miniaturized. Moreover, back focus at the wide angle end is likely to be short, and thereby, in the case that the zoom lenses disclosed in Japanese Unexamined Patent Publication No. 2009-009104 and Japanese Unexamined Patent Publication No. 2009-115874 are applied to a single-lens reflex camera, a space for a mirror, a filter, and the like cannot be secured. Furthermore, both of the zoom lenses disclosed in Japanese Unexamined Patent Publication No. 2009-009104 and Japanese Unexamined Patent Publication No. 2009-115874 have a zoom ratio of approximately 10, which is not a sufficiently high zoom ratio.

The present invention has been developed in view of the above circumstances. It is an object of the present invention to provide a zoom lens having high performance, which has a small size and a long back focus while having a high zoom ratio that exceeds 12.

A zoom lens according to the present invention substantially consists of a first lens group having positive refractive power, a second lens group having negative refractive power, a third lens group having positive refractive power, and a fourth lens group having positive refractive power in this order form the object side, wherein each of the lens groups is moved such that the distance between the first lens group and the second lens group increases, the distance between the second lens group and the third lens group decreases, and the distance between the third lens group and the fourth lens group decreases while changing magnification from the wide angle end to the telephoto end;

the fourth lens group substantially consists of a fourth-a lens group having positive refractive power and a fourth-b lens group having negative refractive power in this order from the object side; and only the fourth-b lens group is moved toward the image side while focusing from an infinity to a close distance.

Note that the zoom lens of the present invention substantially consists of a first lens group, a second lens group, a third lens group, and a fourth lens group, and may be a lens that includes lenses substantially without any refractive power; optical elements other than lenses such as aperture stops, glass covers, and the like; and mechanical components such as lens flanges, lens barrels, imaging elements, camera shake correction mechanisms, and the like; in addition to the four lens groups.

In the present invention, surface shapes of lenses, such as a convex surface, a concave surface, a planar surface, biconcave, meniscus, biconvex, plano-convex, plano-concave, and the like; and signs of the refractive powers of lenses, such as positive and negative, should be considered in paraxial regions if aspheric surfaces are included therein, unless otherwise noted. Moreover, in the present invention, the sign of the radius of curvature is positive in the case that a surface shape is convex on the object side, and negative in the case that the surface shape is convex on the image side.

In the zoom lens of the present invention, it is preferable for at least one of the surfaces in the fourth-b lens groups to be an aspheric surface, of a shape in which negative refractive power becomes stronger at positions further away from the optical axis.

In the zoom lens of the present invention, it is preferable for the third lens group to substantially consist of a third-a lens group having positive refractive power and a third-b lens group having negative refractive power in this order from the object side, wherein camera shake correction is performed by moving the third-b lens group in a direction perpendicular to the optical axis.

Further, in the zoom lens of the present invention, it is preferable for at least one of the surfaces in the third lens group to be an aspheric surface, of a shape in which negative refractive power becomes weaker at positions further away from the optical axis within a range from half a central light beam radius to the full central light beam radius, at the telephoto end.

In addition, in the zoom lens of the present invention, it is preferable for at least one of the surfaces in the third-b lens group to be an aspheric surface, of a shape in which negative refractive power becomes weaker at positions further away from the optical axis within a range from half a central light beam radius to the full central light beam radius, at the telephoto end.

It is preferable for the zoom lens of the present invention to satisfy conditional formulas (1) and (2) below. The zoom lens of the present invention may preferably have a configuration in which either one of conditional formulas (1) and (2) below is satisfied, or may have a configuration in which a combination of both of the conditional formulas are satisfied.

$$2.5 < |ft/f4b| < 10.0 \quad (1)$$

$$5.0 < |ft/f3b| < 10.0 \quad (2),$$

where
ft: the focal length of the entire system at the telephoto end
f3b: the focal length of the third-b lens group
f4b: the focal length of the fourth-b lens group.

Note that conditional formulas (1-1), (1-2), and (2-1) may be satisfied.

$$2.5 < |ft/f4b| < 7.0 \tag{1-1}$$

$$3.0 < |ft/f4b| < 5.0 \tag{1-2}$$

$$6.0 < |ft/f3b| < 8.0 \tag{2-1}$$

An imaging apparatus of the present invention is configured to include the zoom lens of the present invention described above.

According to the present invention, the fourth lens group substantially consists of a fourth-a lens group having positive refractive power and a fourth-b lens group having negative refractive power in this order from the object side in this order from the object side, and only the fourth-b lens group is configured to be moved toward the image side while focusing from the infinity to the close distance so that no large space is required between the fourth-a lens group and the fourth-b lens group. This allows the entire length of the fourth lens group to be short, thereby enabling miniaturization of the optical system. Furthermore, if the fourth-b lens group having negative refractive power approaches the fourth-a lens group, the back focus at the wide angle end can be long so that a space for a mirror, a filter, and the like of a single-lens reflex camera will be easily secured. Accordingly, a zoom lens having high performance, which is a small size and has a long back focus, while having a high zoom ratio can be obtained, and the sensitivity of movement of images associated with focusing movements can be appropriate.

According to the imaging apparatus of the present invention, the imaging apparatus can be configured to be compact and have high performance as well as can obtain excellent images using imaging elements because the zoom lens of the present invention is included therein.

BRIEF DESCRIPTION OF THE DRAWINGS

FIG. 1 is a collection of cross-sectional views illustrating a first configuration of a zoom lens according to one embodiment of the present invention, corresponding to a lens according to Example 1.

FIG. 16 is a collection of diagrams illustrating various aberrations of the zoom lens according to Example 4, which is at the wide angle end, showing A as spherical aberration, B as astigmatism, and C as distortion.

FIG. 17 is a collection of diagrams illustrating various aberrations of the zoom lens according to Example 4, which is at the intermediate range, showing A as spherical aberration, B as astigmatism, and C as distortion.

FIG. 20 is a collection of diagrams illustrating various aberrations of the zoom lens according to Example 5, which is at the intermediate range, showing A as spherical aberration, B as astigmatism, and C as distortion.

FIG. 21 is a collection of diagrams illustrating various aberrations of the zoom lens according to Example 5, which is at the telephoto end, showing A as spherical aberration, B as astigmatism, and C as distortion.

DESCRIPTION OF THE PREFERRED EMBODIMENTS

Hereinafter, embodiments of the present invention will be described in detail with reference to the accompanying drawings. Each of A, B, and C of FIG. 1 shows a first example of configuration of the zoom lens according to one embodiment of the present invention. This example of the configuration corresponds to a lens of Example 1 to be described later. Note that A of Figure corresponds to an arrangement of an optical system at the wide angle end (in the shortest focal length state), B of FIG. 1 corresponds to an arrangement of the optical system at the intermediate range (in the intermediate focal length state), and C of FIG. 1 corresponds to an arrangement of the optical system at the telephoto end (in the longest focal length state). Similarly, the second through the fifth examples of configurations respectively corresponding to lens configurations of Examples 2 through 5 to be described below are shown in A, B, and C of FIG. 2 through A, B, and C of FIG. 5, respectively. In A, B, and C of FIG. 1 through A, B, and C of FIG. 5, item Ri shows the radius of curvature of the i-th surface, the value of i sequentially increasing from the surface of the constituent element at the most object side, which is designated as 1, toward the image side (image forming side). Item Di shows the distances between i-th surfaces and (i+1)st surfaces along the optical axis Z. Note that regarding the item Di, items are indicated at only the distances between surfaces (D5, D14, D24, and the like) of portions which vary according to changes in the photographing magnification. Only C of FIG. 1 shows a center beam 50.

This zoom lens substantially consists of a first lens group G1 having positive refractive power, a second lens group G2 having negative refractive power, a third lens group G3 having positive refractive power, and a fourth lens group G4 having positive refractive power in this order from the object side along the optical axis Z. It is preferable for an optical aperture stop St to be disposed between the second lens group G2 and the third lens group G3 in the vicinity of the object side of the third lens group G3.

The third lens group G3 substantially consists of a third-a lens group G3a having positive refractive power and a third-b lens group G3b having negative refractive power in this order from the object side. The third-b lens group G3b is configured to be moved in a direction substantially perpendicular to the optical axis to correct displacement of imaging positions due to Camera shake.

The fourth lens group G4 substantially consists of a fourth-a lens group G4a having positive refractive power and a fourth-b lens group G4b having negative refractive power, and the fourth-b lens group G4b moves along the optical axis so as to perform focusing while focusing from an object at infinity to an object at a finite distance.

Figure 5:
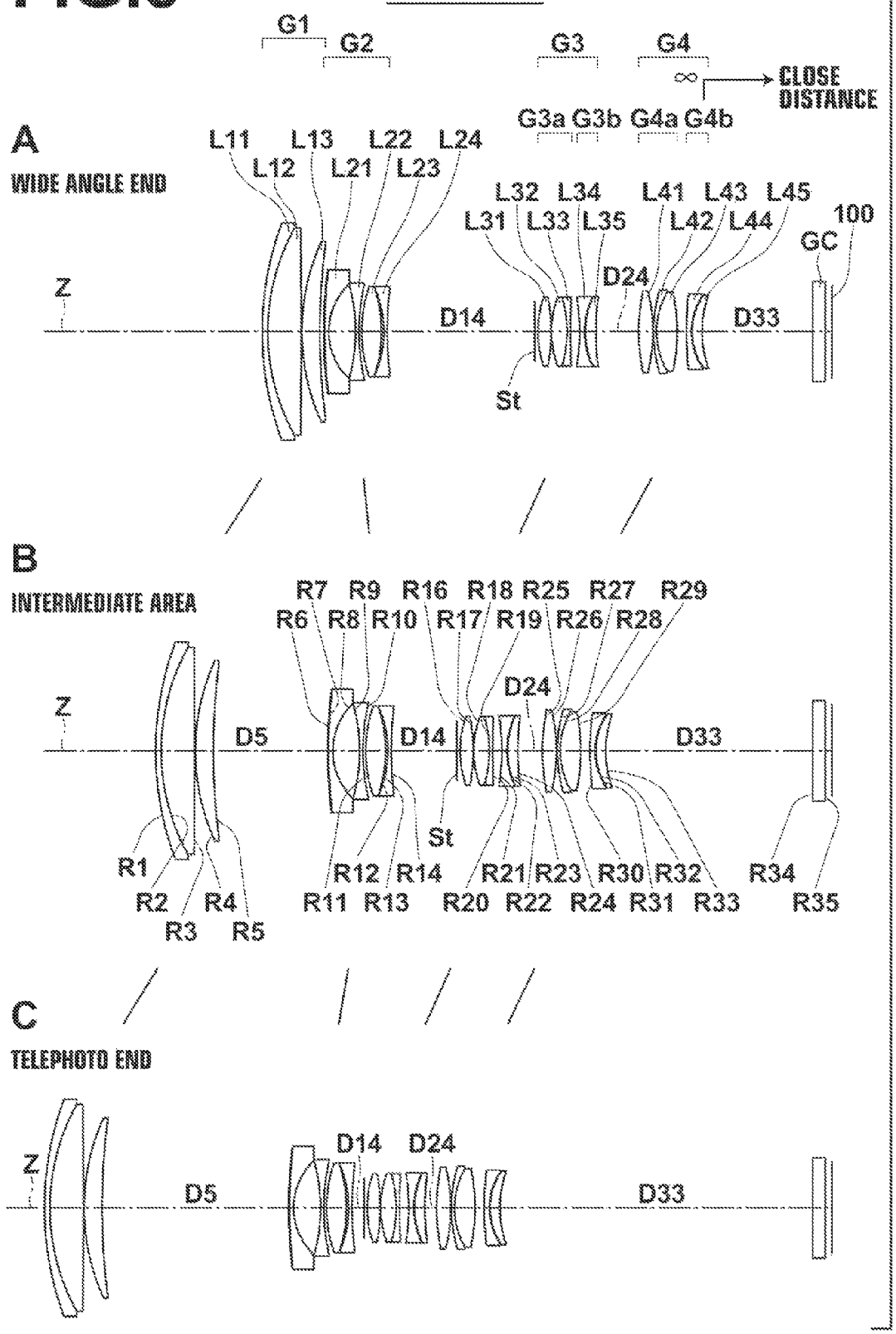
FIG. 5 is a collection of cross-sectional views illustrating a fifth configuration of a zoom lens, corresponding to a lens according to Example 5.

This medium telephoto can be installed in imaging instruments, such as a mirrorless interchangeable-lens camera and the like, for example. An imaging element 100, such as a CCD (Charge Coupled Device), a CMOS (Complementary Metal Oxide Semiconductor), or the like is disposed at an imaging formation surface (imaging surface) of a camera equipped with this zoom lens. The imaging element 100 outputs image signals corresponding to optical images formed by the zoom lens of the present embodiment. The imaging device in the present embodiments is constituted by at least this zoom lens and the imaging element 100. Various kinds of optical members GC may be arranged between the fourth lens group G4, which is the final lens group, and the imaging element 100 in accordance with the configuration of the camera side onto which the lens is mounted. For example, a parallel plate optical member, such as a cover glass for protecting an imaging surface, an infrared ray cut-off filter, or the like may be arranged therebetween. Note that A, B, and C of FIG. 1 through A, B, and C of FIG. 5 show the imaging element 100 and the optical member GC as well.

This zoom lens is configured to change a magnification by moving at least the first lens group G1, the third lens group G3, and the fourth lens group G4 along the optical axis and changing each of the distances between the groups. The aperture stop St is configured to be moved along with the third lens group G3, for example. In other words, each of the lens groups and the aperture stop St moves from a state of A of FIG. 1 to a state of B of FIG. 1, and further to a state of C of FIG. 1 so as to draw the paths indicated by the solid lines in the Figure, accompanying a change in magnification from the wide angle end to the intermediate range, and further to the telephoto end.

More particularly, the respective lens groups move such that the distance between the first lens group G1 and the second lens group G2 increases, the distance between the second lens group G2 and the third lens group G3 decreases, and the distance between the third lens group G3 and the fourth lens group G4 decreases, while changing magnification from a wide angle end state to a telephoto end state. If each of the lens groups is moved in such a manner, changing magnification is effectively accomplished by the respective lens groups.

Further, it is preferable for the first lens group G1 to be moved toward the object side while changing magnification from the wide angle state to the telephoto end state. Magnification can be effectively changed and favorable optical performance is achieved over the entire range of magnification by moving the first lens group G1 in such a manner.

In addition, it is desirable that the third lens group G3 and the fourth lens group G4 are moved toward the object side and the second lens group G2 is moved while changing magnification from a wide angle end state to a telephoto end state. If each of the lens groups is moved in such a manner, changes in magnification are effectively accomplished by the respective lens groups.

By adopting such a configuration in the zoom lens of the present invention, a large space will not be required between the fourth-a lens G4a group and the fourth-b lens group G4b. This allows the entire length of the fourth lens group G4 to be short, thereby enabling miniaturization of the optical system. Furthermore, if the fourth-b lens group G4b having negative refractive power approaches the fourth-a lens group G4a, the back focus at the wide angle end can be long so that a space for a mirror, a filter, and the like of a single-lens reflex camera will be easily secured. In such a manner, according to the present embodiment, a zoom lens having high performance, which is of a small size and has a long back focus, while having a high zoom ratio exceeding 12 can be obtained, and further the sensitivity of movement of images associated with focusing movements can be appropriate.

By configuring the third lens group G3 to substantially consist of the third-a lens group G3a having positive refractive power and the third-b lens group G3b having negative refractive power, the effective diameter of the third-b lens group G3b can be small by the positive refractive power of the third-a lens group G3a. Thereby, the weight of a camera shake correction group will be reduced and a burden on a vibration preventing drive system can be lightened.

In addition, it is preferable for the zoom lens of the present embodiments to satisfy conditional formula (1) below:

$$2.5 < |ft/f4b| < 10.0 \qquad (1).$$

where,
ft: the focal length of the entire system at the telephoto end
f4b: the focal length of the fourth-b lens group G4b.

By satisfying conditional formula (1), a focusing operation can be performed at a high speed and a focus control can be easily performed. If the value of |ft/f4b| is lower than the lower limit defined by conditional formula (1), the power of the fourth-b lens group G4b will become weak, the amount of movement of the fouth-b lens group G4b will be increased while focusing, and additionally, the effective diameter of the fourth-b lens group G4b will be large. As the result thereof, a burden on the focusing drive system will be increased and focusing at a high speed will be difficult. If the value of |ft/f4b| exceeds the upper limit defined by conditional formula (1), the sensitivity of movement of an image associated with focusing movements will become excessively high and the amount of reciprocal movement of the fourth-b lens group G4b for finding a best focus position will be excessively small. As the result thereof, the lenses will not move, and the like and a focus control will become difficult.

In order to achieve further accelerated focusing operations and facilitation of focus control, it is preferable for conditional formula (1-1) below to be satisfied. In addition, it is more preferable for conditional formula (1-2) below to be satisfied.

$$2.5<|ft/f4b|<7.0 \tag{1-1}$$

$$3.0<|ft/f4b|<5.0 \tag{1-2}$$

It is preferable for at least one of the surfaces of the fourth-b lens group G4b to be an aspheric surface of a shape in which negative refractive power becomes stronger at positions further away from the optical axis. Thereby, various aberrations while changing magnification and focusing can be balanced.

In addition, it is preferable for the zoom lens of the present embodiments to satisfy conditional formula (2) below:

$$5.0<|ft/f3b|<10.0 \tag{2}$$

where, f3b: the focal length of the fourth-b lens group G3b.

By satisfying conditional formula (2), a reduction in the size of an actuator for driving the third-b lens group G3b and a control of a camera shake correction group with respect to small vibrations will be facilitated. If the value of |ft/f3b| is lower than the lower limit defined by conditional formula (2), the refractive power of the third-b lens group G3b will become weak and the amount of movement of the third-b lens group G3b which is necessary during vibration preventing operations will be excessively increased, and thereby, the size of the actuator for driving the third-b lens group G3b will be large. If the value of |ft/f3b| exceeds the upper limit defined by conditional formula (2), the refractive power of the third-b lens group G3b will become strong and the amount of movement of the third-b lens group G3b which is necessary during vibration preventing operations will be excessively decreased, and thereby, control of a camera shake correction group with respect to small vibrations will become difficult.

In order to achieve a further reduction in the size of the actuator and to facilitate control of a camera shake correction group with respect to small vibrations, it is preferable for conditional formula (2-1) below to be satisfied.

$$6.0<|ft/f3b|<8.0 \tag{2-1}$$

It is preferable for at least one of the surfaces in the third lens group G3 to be an aspheric surface, of a shape in which negative refractive power becomes weaker at positions further away from the optical axis within a range from half a central light beam radius to the full central light beam radius, at the telephoto end. Furthermore, it is preferable for at least one of the surfaces in the third-b lens group 3 Gb to be an aspheric surface, of a shape in which negative refractive power becomes weaker at positions further away from the optical axis within a range from half a central light beam radius to the full central light beam radius, at the telephoto end. Thereby, variations in various aberrations can be suppressed while preventing vibration and changing magnification.

Figure 6:
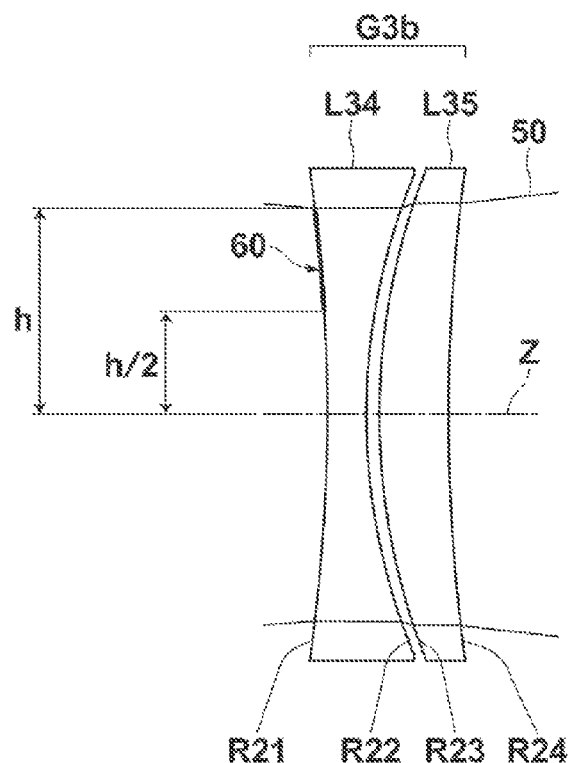
FIG. 6 shows a configuration of a third-b lens group G3b corresponding to the optical system arrangement of C of FIG. 1.

FIG. 6 shows a configuration of the third-b lens group G3b according to the optical system arrangement of C of FIG. 1. In FIG. 6, h refers to a central light beam radius in a surface R21 which is an object-side surface of the 3-4th lens L34 in the third-b lens group G3b. Thus, the range 60 from h/2, which is half the central light beam radius h, to the full central light beam radius h corresponds to a range from half a central light beam radius to the full central light beam radius, at the telephoto end. Accordingly, in the case that the surface R21 which is an object-side surface on the object side of the 3-4th lens L34 in the third lens group G3 is an aspheric surface of a shape in which negative refractive power becomes weaker at positions further away from the optical axis Z within a range from half the central light beam radius to the full central light beam radius, at the telephoto end; the range 60 shown in FIG. 6 is an aspheric shape in which negative refractive power becomes weaker in positions further away from the optical axis Z.

[Example of Application to Imaging Devices]

Figure 22A:
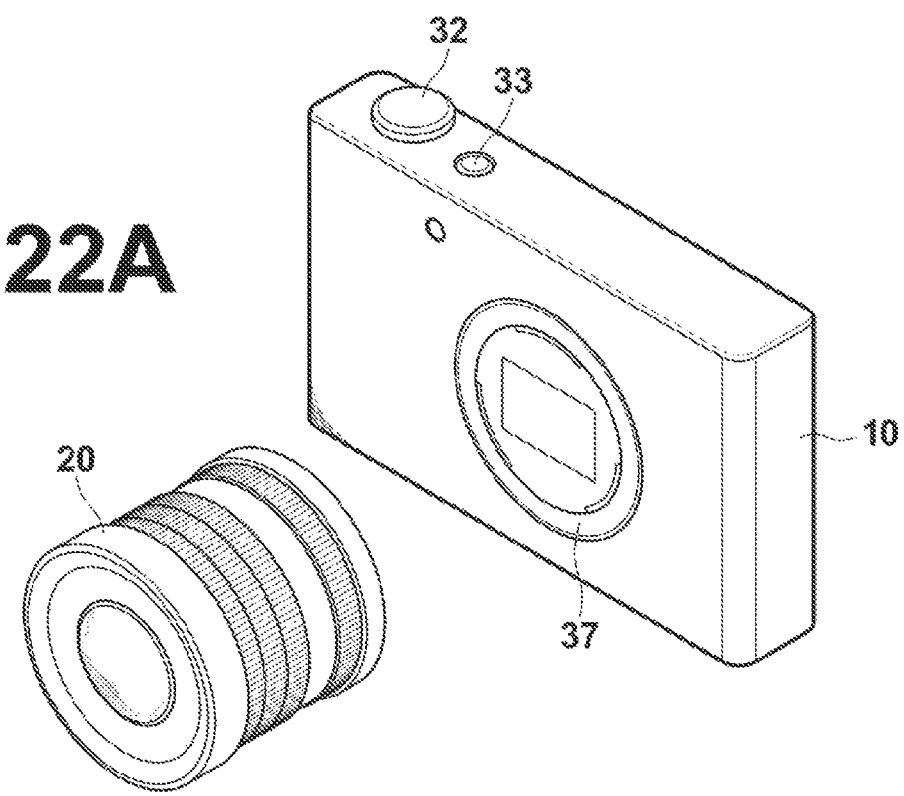
FIG. 22A illustrates the outer appearance of a mirrorless interchangeable lens camera, illustrating one example of a configuration thereof as an imaging device according to one embodiment of the present invention.
Figure 22B:
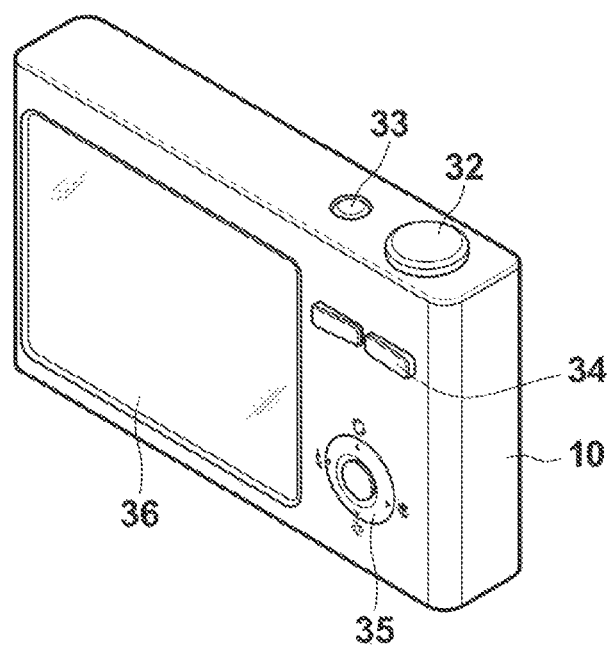
FIG. 22B illustrates the outer appearance of a mirrorless interchangeable lens camera, illustrating one example of a configuration thereof as an imaging device according to one embodiment of the present invention.

FIG. 22A and FIG. 22B show a mirrorless single-lens camera as an example of the imaging apparatus according to the present embodiment. FIG. 22A shows the outer appearance of this camera viewed from the front, and FIG. 22B shows the outer appearance of this camera viewed from the back. This camera includes a camera body 10 provided with a shutter release button 32 and a power button 33 on the upper surface thereof. Further, operation sections 34 and 35 as well as a display section 36 are on the back surface of the camera body 10. The display section 36 is for displaying photographed images.

A photographing aperture, into which light from a target of photography enters, is provided in the center of the front surface the camera body 10; a mount 37 is provided on a position corresponding to the photographing aperture; and the interchangeable lens 20 is mounted to the camera body 10 through the mount 37. The interchangeable lens 20 houses a lens member within a lens barrel. The camera body 10 is provided with an imaging element, such as a CCD, and the like, which outputs image signals according to an image of a subject formed by the interchangeable lens 20; a signal processing circuit which processes the image signals output from the imaging element and which generates images; and a recording medium for recording the generated images; and the like. In this camera, a still image corresponding to one flame is photographed by pressing the shutter release button 32 and the image data obtained by this photography is recorded on the above recording medium (not shown) within the camera body 10.

Image signals with high resolution can be obtained by employing the zoom lens according to the present embodiments as the interchangeable lens 20 for such a mirrorless interchangeable-lens camera. High-resolution images can be generated based on the image signals on the side of the camera body 10.

Note that the zoom lens according to the present embodiments can be applied not only to a mirrorless interchangeable-lens camera but also to various kinds of electronic cameras such as a single-lens reflex camera, a video camera, a broadcasting camera, a movie camera, a surveillance camera, and the like.

EXAMPLE

Next, specific Examples of zoom lenses according to the present embodiments will be described.

Example 1

A, B, and C of FIG. 1 are diagrams illustrating configurations of the zoom lens according to Example 1 of the present invention.

The first lens group G1 of the zoom lens according to Example 1 substantially consists of a 1-1st lens L11 having a negative meniscus shape with a concave surface toward the image side, a 1-2nd lens L12 having a positive biconvex shape, and a 1-3rd lens L13 having a positive meniscus shape with a convex surface toward the object side in this order from the object side. A cemented lens is formed by cementing the 1-1st lens L11 and the 1-2nd lens L12 together.

The second lens group G2 substantially consists of a 2-1st lens L21 having a negative meniscus shape with a concave surface toward the image side, a 2-2nd lens L22 having a negative biconcave shape, a 2-3rd lens L23 having a positive biconvex shape, and a 2-4th lens L24 having a negative biconcave shape in this order from the object side. The 2-2nd lens L22 is a compound aspheric lens. That is, a surface R8, which is an object-side surface of the 2-2nd lens L22, has a compound aspheric surface formed by coating a resin on an object-side surface. Note that R9 is a bonding surface between a glass and the resin of the 2-2nd lens L22.

The third-a lens group G3a substantially consists of a 3-1st lens L31 having a positive biconvex shape, a 3-2nd lens L32 having a positive biconvex shape, and a 3-3rd lens L33 having a negative biconcave shape in this order from the object side. A cemented lens is formed by cementing the 3-2nd lens L32 and the 3-3rd lens L33 together.

The third-b lens group G3b substantially consists of a 3-4th lens L34 having a negative biconcave shape and a 3-5th lens L35 having a positive meniscus shape with a convex surface toward the object side in this order from the object side. A surface R21 which is a surface on the object side of the 3-4th lens L34 is configured to be aspheric.

The fourth-a lens group G4a substantially consists of a 4-1st lens L41 having a positive biconvex shape, a 4-2nd lens L42 having a negative meniscus shape with a concave surface toward the image side, and a 4-3rd lens L43 having a positive biconvex shape in this order from the object side. A cemented lens is composed by cementing a 4-2nd lens L42 and a 4-3rd lens L43 together. The 4-1st lens L41 is formed by a surface R25 on the object side thereof and a surface R26 on the image side thereof, both of which are aspheric.

The fourth-b lens group G4b substantially consists of a 4-4th lens L44 having a positive meniscus shape with a convex surface toward the image side and a 4-5th lens L45 having a negative biconcave shape in this order from the object side. A surface R32 which is a surface on the object side of the 4-5th lens L45 is configured to be an aspheric surface.

Note that in Example 1, the center beam radius of a surface R21 of the 3-4th lens L34 in the third lens group G3 at the telephoto end is 7.952 mm.

Tables 1 and 2 show specific lens data corresponding to configurations of the zoom lens illustrated in A, B, and C of FIG. 1. Table 1 shows basic lens data thereof, and Table 2 shows other data. The column Si in the basic lens data shown in Table 1 with respect to the zoom lens according to Example 1 represents the i-th (i=1 through 21) surface number, the value of i sequentially increasing from the surface of the constituent element at the most-object side, which is designated as 1, toward the image side. The column of the radius of curvature Ri shows the values (mm) of the radius of curvature of the i-th surface from the object side, which correspond to item Ri indicated in C of FIG. 1. The column of the distance between surfaces Di also shows distances (nm) between i-th surfaces and (i+1)st surfaces from the object side along the optical axis. The column Ndj shows values of the refractive index with respect to the d-line (587.6 nm) of the constituent element of i-th surface (j=1, 2, 3, . . . ), the value of sequentially increasing from a lens on the most object side, which is designated as 1, toward the images side. The column vdj shows the Abbe number with respect to the d-line of the j-th optical element. Table 2 also shows values of an axial focusing distance f (mm) of the entire system in a state focused on infinity, an F-number (FNO.), and an angle of view (2ω) as various data.

In Table 1, the lens groups are respectively shown as a first group, a second group . . . . The third-b lens for performing camera shake correction is labeled with letters OIS (Optical Image Stabilizer), and the fourth-b lens group for focusing is labeled with letters FOCUS.

In the zoom lens according to Example 1, since the distance between the first lens group G1 and the second lens group G2, the distance between the second lens group G2 and the third lens group G3, and the distance between the third lens group G3 and the fourth lens group G4 vary according to changes in magnification, the values of the distance D5 between surfaces of the first lens group G1 and the second lens group G2, the distance D14 between surfaces of the second lens group G2 and the third lens group G3, the distance D24 between surfaces of the third lens group G3 and the fourth lens group G4, and the distance D33 between surfaces between the fourth lens group G4 and the optical member GC are variable. Table 2 shows data with respect to the distances between surfaces D5, D14, D24, and D33 while changing magnification, each of which are in a state focused on infinity at the wide angle end (WIDE), the intermediate range (MID), and the telephoto end (TELE).

In lens data of Table 1, the mark "*" is indicated at the left of surface numbers for lens surfaces which are aspheric surfaces. In the basic lens data of Table 1, numerical values of paraxial radii of curvature are indicated as the radii of curvature of these aspheric surfaces.

Table 3 shows aspheric surface data of the zoom lens according to Example 1. In numerical values shown as aspheric surface data, the mark "E" represents that a numerical value following the mark "E" is "an exponent" with the base-10. Further, a numerical value expressed by an exponential function with the base-10 is multiplied with a numerical value followed by "E". For example, the expression "1.0E-02" represents "$1.0 \times 10^{-2}$".

The aspheric surface data of the zoom lens according to Example 1 shows the values of respective coefficients An, K in the expression of an aspheric surface shape expressed by the formula (A) below. Z represents the length (mm) of a perpendicular line drawn from a point on an aspheric surface with a height Y from the optical axis to a plane which contacts the peak of the aspheric surface (a plane perpendicular to the optical axis).

$$Z = C \cdot Y^2 / \{1 + (1 - K \cdot C^2 \cdot Y^2)^{1/2}\} + \Sigma An \cdot Y^n \quad (A)$$

(n=an integer of 3 of greater)
where,
Z: the depth of aspheric surface (mm)
Y: the distance (height) from the optical axis to a lens surface (mm)
K: an aspheric surface coefficient representing a quadric surface
C: a paraxial curvature=1/R
(R: a paraxial radius of curvature)
An: an aspheric surface coefficient of order n
The aspheric surface of the medium telephoto lens according to Example 1 is expressed by effectively applying orders of A3 through A10 to an aspheric surface coefficient An, based on the above aspheric surface formula (A).

Examples 2 and 3

Figure 2:
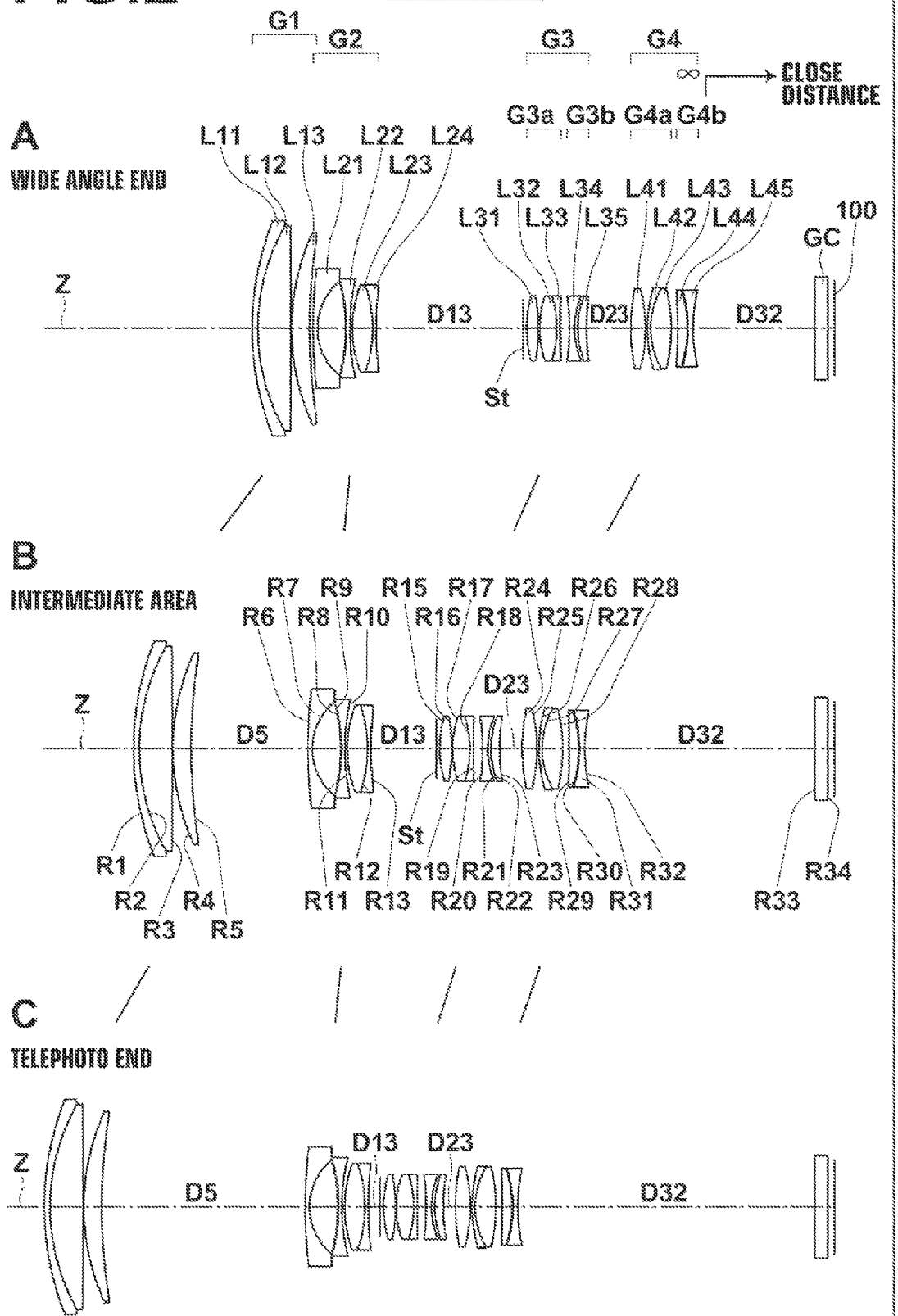
FIG. 2 is a collection of cross-sectional views illustrating a second configuration of a zoom lens, corresponding to a lens according to Example 2.
Figure 3:
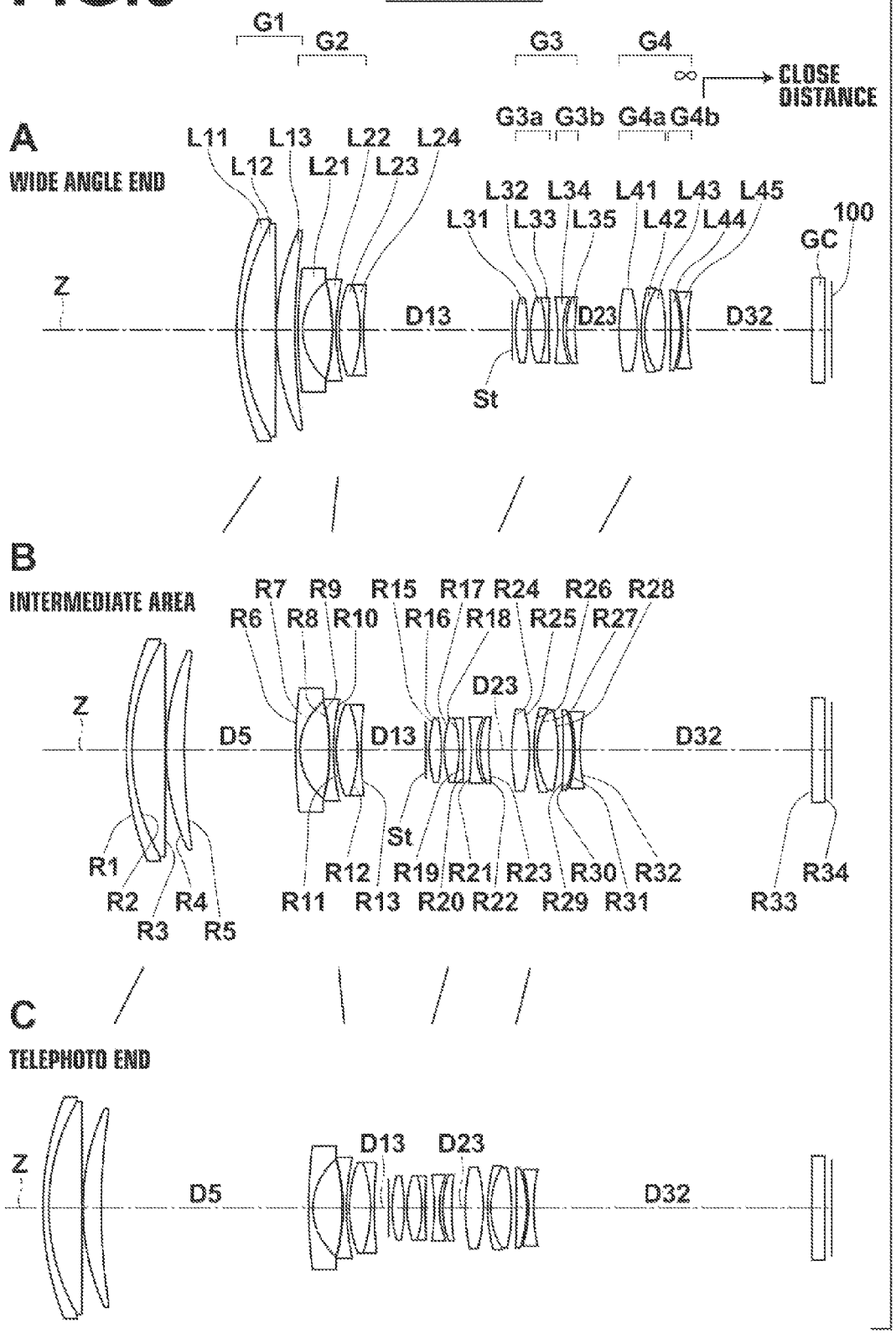
FIG. 3 is a collection of cross-sectional views illustrating a third configuration of a zoom lens, corresponding to a lens according to Example 3.

A, B, and C of FIG. 2 show configurations of the zoom lens according to Example 2 of the present invention, and A, B, and C of FIG. 3 show configurations of the zoom lens according to Example 3 of the present invention. The zoom lenses according to Examples 2 and 3 have substantially the same configuration as the zoom lens according to Example 1. However, Examples 2 and 3 differ from Example 1 in that a cemented lens is formed by cementing a 2-3rd lens L23 of the second lens group G2 and a 2-4th lens L24 thereof together, and accordingly, the surface numbers of the lenses on the image side of the 2-4th lens L24 are shifted by one from those of Example 1.

In the same manner as Example 1 described above, specific lens data of the zoom lens according to Example 2 is shown in Tables 4 through 6. In addition, specific lens data of the zoom lens according to Example 3 is shown in Tables 7 through 9. Note that each of the zoom lenses according to Examples 2 and 3 is configured such that an object-side surface of the 2-2nd lens L22 is a compound aspheric surface, and each of an object-side surface R20 of the 3-4th lens L34; an object-side surface R24 and the image-side surface R25 of the 4-1st lens L41; and an object-side surface R31 of the 4-5th lens L45 is an aspheric surface. Note that in Examples 2 and 3, central light beam radii of the surface R20 of the 3-4th lens L34 in the third lens group G3 at the telephoto end are 7.885 mm and 7.728 mm, respectively.

Example 4

Figure 4:
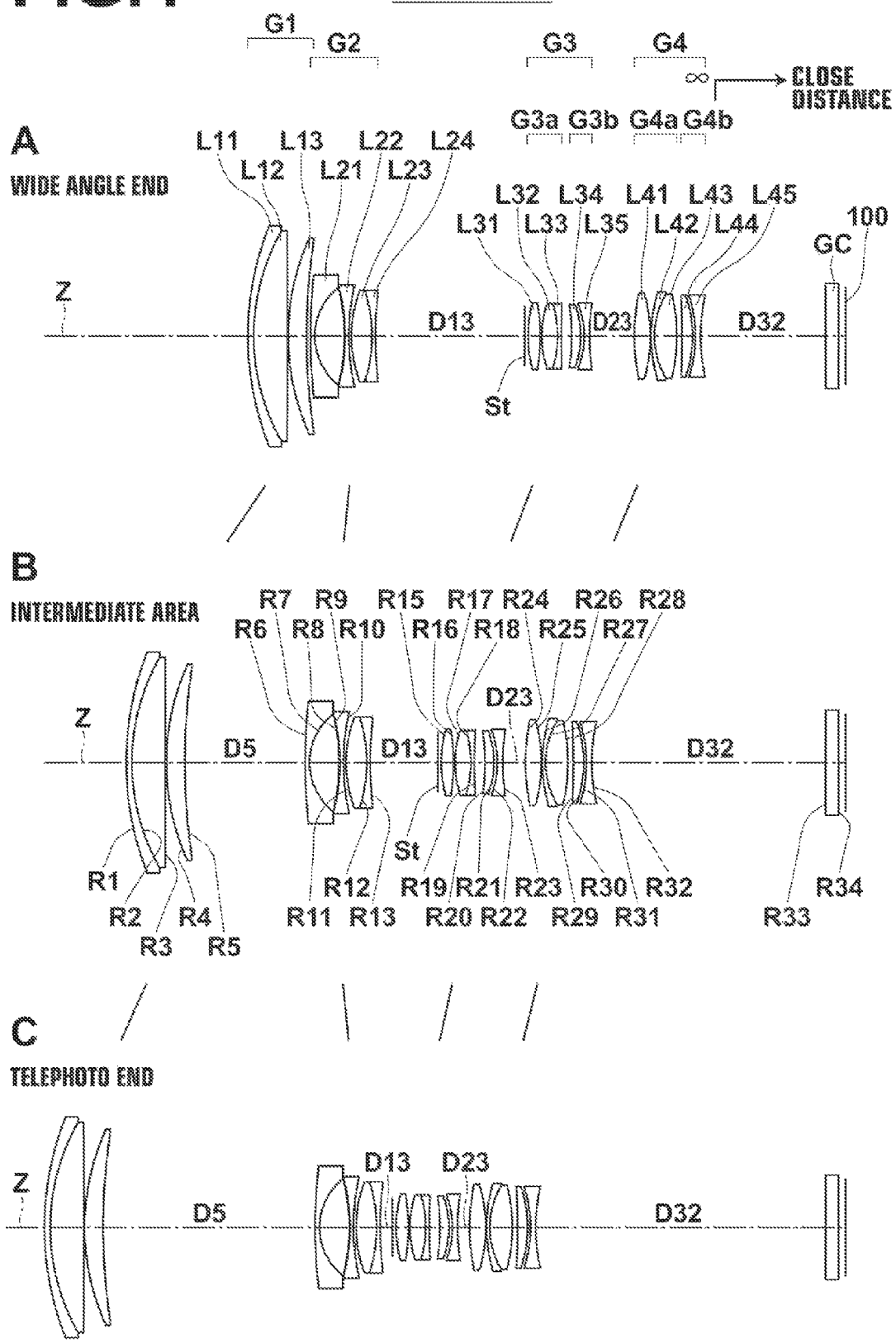
FIG. 4 is a collection of cross-sectional views illustrating a fourth configuration of a zoom lens, corresponding to a lens according to Example 4.

A, B, and C of FIG. 4 show configurations of the zoom lens according to Example 4 of the present invention. The zoom lens of Example 4 has substantially the same configuration as the zoom lens according to Example 1. However, the zoom lens of Example 4 differs from that of Example 1 in that the 2-3rd lens L23 of the second lens group G2 and the 2-4th lens L24 thereof are cemented to each other so as to form a cemented lens, and accordingly, surface numbers of the image-side surfaces from the 2-4th lens L24 are shifted by one from those of Example 1; and in that the third-b lens group G3b substantially consists of a 3-4th lens L34 having a positive meniscus shape with a convex surface toward the image side and a 3-5th lens L35 having a negative biconcave shape in this order from the object side.

In the same manner as for Example 1 described above, specific lens data of the zoom lens according to Example 4 is shown in Tables 10 through 12. Note that the zoom lens according to Example 4 is configured such that an object-side surface of the 2-2nd lens L22 is a compound aspheric surface; and each of an image-side surface R23 of the 3-5th lens L35, an object-side surface R24 and an image-side surface R25 of the 4-1st lens L41, and an object-side surface R31 of the 4-5th lens L45 is an aspheric surface.

Note that in Example 4, a central light beam radius of a surface R23 of the 3-5th lens L35 in the third lens group G3 at the telephoto end is 7.715 mm.

Example 5

A, B, and C of FIG. 5 show configurations of the zoom lens according to Example 5 of the present invention. The zoom lens of Example 5 has substantially the same configuration as the zoom lens according to Example 1. However, the zoom lens of Example 5 differs from that of Example 1 in that an object-side surface of the 2-1st lens L21 is a compound aspheric surface; the 2-2nd lens L22 has no compound aspheric surfaces; and the fourth-b lens group G4b substantially consists of a 4-4th lens L44 having a negative meniscus shape with a concave surface toward the image side and a 4-5th lens L45 having a positive meniscus shape with a convex surface toward the object side in this order from the object side.

In the same manner as for Example 1 described above, specific lens data of the zoom lens according to Example 5 is shown in Tables 13 through 15. Note that the zoom lens according to Example 5 is configured such that an object-side surface of the 2-1st lens L21 is a composite aspheric surface; and each of an object-side surface R21 of the 3-4th lens L34, an object-side surface R25 of the 4-1st lens L41 and an image-side surface R26 thereof, and an image-side surface R31 of the 4-5th lens L45 is an aspheric surface.

Note that in Example 5, a central light beam radius of a surface R21 of the 3-4th lens L34 in the third lens group G3 at the telephoto end is 8.644 mm.

TABLE 1

EXAMPLE 1

| Si | Ri | Di | Ndj | vdj | Group Configuration |
|---|---|---|---|---|---|
| 1 | 87.3686 | 1.650 | 1.84661 | 23.9 | Group 1 |
| 2 | 61.5869 | 9.210 | 1.49700 | 81.5 | |
| 3 | −84254.3362 | 0.200 | | | |
| 4 | 67.2499 | 5.140 | 1.61800 | 63.3 | |
| 5 | 191.2990 | D5 (Variable) | | | |
| 6 | 133.9024 | 1.250 | 1.88300 | 40.8 | Group 2 |
| 7 | 18.3386 | 8.239 | | | |
| *8 | −55.2416 | 0.200 | 1.52771 | 41.8 | |
| 9 | −55.7648 | 1.000 | 1.83481 | 42.7 | |
| 10 | 62.5699 | 0.749 | | | |

TABLE 1-continued

EXAMPLE 1

| Si | Ri | Di | Ndj | vdj | Group Configuration |
|---|---|---|---|---|---|
| 11 | 38.6488 | 5.850 | 1.80809 | 22.8 | |
| 12 | −38.4249 | 0.320 | | | |
| 13 | −34.1419 | 1.000 | 1.75500 | 52.3 | |
| 14 | 107.7468 | D14 (Variable) | | | |
| 15 (Aperture Stop) | ∞ | 1.000 | | | Group 3a |
| 16 | 35.3365 | 3.457 | 1.58267 | 46.4 | |
| 17 | −51.8449 | 0.776 | | | |
| 18 | 29.0763 | 4.740 | 1.49700 | 81.5 | |
| 19 | −32.2045 | 1.000 | 1.90366 | 31.3 | |
| 20 | 222.8475 | 2.573 | | | |
| *21 | −62.5586 | 1.500 | 1.80348 | 40.4 | Group 3b (OIS) |
| 22 | 24.1648 | 0.500 | | | |
| 23 | 25.7957 | 2.665 | 1.84661 | 23.9 | |
| 24 | 70.6543 | D24 (Variable) | | | |
| *25 | 47.9627 | 4.569 | 1.51560 | 63.1 | Group 4a |
| *26 | −43.6871 | 1.842 | | | |
| 27 | 44.4536 | 0.900 | 1.92286 | 20.9 | |
| 28 | 23.2918 | 6.186 | 1.51742 | 52.4 | |
| 29 | −51.6319 | 2.196 | | | |
| 30 | −207.5064 | 2.917 | 1.84661 | 23.9 | Group 4b (FOCUS) |
| 31 | −35.5402 | 0.490 | | | |
| *32 | −37.9961 | 1.500 | 1.80348 | 40.4 | |
| 33 | 57.3972 | D33 (Variable) | | | |
| 34 | ∞ | 3.700 | 1.51680 | 64.2 | GC |
| 35 | ∞ | | | | |

TABLE 2

| | The Distance Between Surfaces | | |
|---|---|---|---|
| | WIDE | MID | TELE |
| D5 | 1.089 | 34.831 | 59.665 |
| D14 | 41.410 | 18.410 | 3.475 |
| D24 | 14.178 | 7.378 | 3.491 |
| D33 | 34.007 | 64.958 | 85.997 |
| f | 18.386 | 70.012 | 266.596 |
| FNO. | 3.55 | 5.21 | 6.65 |
| 2ω [°] | 76.27 | 21.69 | 5.81 |

TABLE 3

Aspheric Surface Coefficient

| | Surface Number | | | | |
|---|---|---|---|---|---|
| | 8 | 21 | 25 | 26 | 32 |
| K | 5.519472E−01 | 1.000000E+00 | 1.000000E+00 | 1.000000E+00 | 1.000000E+00 |
| A3 | 0.000000E+00 | −9.836083E−06 | 2.357053E−05 | 9.831502E−06 | −1.074220E−05 |
| A4 | 3.229389E−06 | 1.024860E−05 | −1.747715E−05 | 3.822113E−07 | 1.278697E−07 |
| A5 | 0.000000E+00 | −6.414006E−07 | −3.023556E−07 | 4.572721E−09 | −3.028724E−07 |
| A6 | −5.366086E−09 | 2.854403E−08 | 1.881154E−07 | −5.792114E−10 | −3.683762E−09 |
| A7 | 0.000000E+00 | 2.717068E−09 | −2.500011E−08 | −7.093749E−11 | 2.619424E−09 |
| A8 | 4.389442E−12 | −7.349497E−11 | 1.241630E−09 | −5.303579E−12 | 7.710930E−11 |
| A9 | 0.000000E+00 | −1.713001E−11 | −2.830553E−13 | −2.793898E−13 | −2.597491E−11 |
| A10 | 6.074069E−14 | 6.326875E−13 | −1.370514E−12 | −4.437006E−15 | 1.073806E−12 |

TABLE 4

EXAMPLE 2

| Si | Ri | Di | Ndj | vdj | Group Configuration |
|---|---|---|---|---|---|
| 1 | 85.6564 | 1.650 | 1.84661 | 23.9 | Group 1 |
| 2 | 61.3412 | 9.644 | 1.49700 | 81.5 | |
| 3 | −2816.2660 | 0.200 | | | |
| 4 | 67.4970 | 5.291 | 1.61800 | 63.3 | |
| 5 | 175.7026 | D5 (Variable) | | | |
| 6 | 149.2302 | 1.250 | 1.88300 | 40.8 | Group 2 |
| 7 | 17.9448 | 8.266 | | | |
| *8 | −54.9413 | 0.200 | 1.52771 | 41.8 | |
| 9 | −52.9053 | 1.000 | 1.80400 | 46.6 | |
| 10 | 63.1070 | 0.749 | | | |
| 11 | 36.1340 | 5.930 | 1.80809 | 22.8 | |
| 12 | −38.7242 | 1.000 | 1.83481 | 42.7 | |
| 13 | 103.9635 | D13 (Variable) | | | |
| 14 (Aperture Stop) | ∞ | 1.000 | | | Group 3a |
| 15 | 34.5752 | 3.506 | 1.61340 | 44.3 | |
| 16 | −53.3817 | 0.245 | | | |
| 17 | 28.5211 | 5.050 | 1.49700 | 81.5 | |
| 18 | −31.9623 | 1.000 | 1.90366 | 31.3 | |
| 19 | 195.2348 | 2.710 | | | |
| *20 | −63.0006 | 1.500 | 1.80348 | 40.4 | Group 3b (OIS) |
| 21 | 24.4330 | 0.956 | | | |
| 22 | 26.9170 | 2.498 | 1.84661 | 23.9 | |
| 23 | 62.8543 | D23 (Variable) | | | |
| *24 | 48.9113 | 4.374 | 1.51560 | 63.1 | Group 4a |
| *25 | −43.5856 | 0.523 | | | |
| 26 | 43.4326 | 0.900 | 1.92286 | 20.9 | |
| 27 | 23.2535 | 6.010 | 1.51742 | 52.4 | |
| 28 | −50.3967 | 1.888 | | | |
| 29 | −225.5485 | 2.889 | 1.84661 | 23.9 | Group 4b |

TABLE 4-continued

EXAMPLE 2

| Si | Ri | Di | Ndj | vdj | Group Configuration |
|---|---|---|---|---|---|
| 30 | −34.9184 | 0.184 | | | (FOCUS) |
| *31 | −38.8360 | 1.500 | 1.80348 | 40.4 | |
| 32 | 52.2630 | D32 (Variable) | | | |
| 33 | ∞ | 3.700 | 1.51680 | 64.2 | GC |
| 34 | ∞ | | | | |

TABLE 5

The Distance Between Surfaces

| | WIDE | MID | TELE |
|---|---|---|---|
| D5 | 0.998 | 34.110 | 59.405 |
| D13 | 42.972 | 19.050 | 3.466 |
| D23 | 12.914 | 6.664 | 3.497 |
| D32 | 35.504 | 67.161 | 86.723 |
| f | 18.389 | 70.022 | 266.637 |
| FNO. | 3.55 | 5.23 | 6.54 |
| 2ω [°] | 76.57 | 21.69 | 5.81 |

TABLE 6

Aspheric Surface Coefficient

| | Surface Number | | | | |
|---|---|---|---|---|---|
| | 8 | 20 | 24 | 25 | 31 |
| K | 1.857006E+00 | 1.000000E+00 | 1.000000E+00 | 1.000000E+00 | 1.000000E+00 |
| A3 | 0.000000E+00 | −6.555079E−06 | 2.230991E−05 | 1.183722E−05 | −9.734280E−06 |
| A4 | 1.862035E−06 | 1.091544E−05 | −1.771366E−05 | 7.204801E−07 | −1.813133E−07 |
| A5 | 0.000000E+00 | −6.025490E−07 | −3.124010E−07 | 1.815666E−08 | −3.162142E−07 |
| A6 | −8.958135E−09 | 3.010946E−08 | 1.878334E−07 | −2.830274E−10 | −4.144355E−09 |
| A7 | 0.000000E+00 | 2.751633E−09 | −2.500081E−08 | −7.460904E−11 | 2.596691E−09 |
| A8 | 1.069766E−11 | −7.644851E−11 | 1.242218E−09 | −6.165028E−12 | 7.534217E−11 |
| A9 | 0.000000E+00 | −1.794050E−11 | −2.428850E−13 | −3.144574E−13 | −2.607195E−11 |
| A10 | −6.079472E−14 | 4.879310E−13 | −1.370921E−12 | −1.255310E−15 | 1.079595E−12 |

TABLE 7

EXAMPLE 3

| Si | Ri | Di | Ndj | vdj | Group Configuration |
|---|---|---|---|---|---|
| 1 | 85.6974 | 1.650 | 1.84661 | 23.9 | Group 1 |
| 2 | 61.7347 | 9.550 | 1.49700 | 81.5 | |
| 3 | −5133.9179 | 0.200 | | | |
| 4 | 68.6955 | 5.230 | 1.61800 | 63.3 | |
| 5 | 179.4834 | D5 (Variable) | | | |
| 6 | 144.7642 | 1.250 | 1.88300 | 40.8 | Group 2 |
| 7 | 17.9613 | 8.378 | | | |
| *8 | −55.8339 | 0.200 | 1.52771 | 41.8 | |
| 9 | −53.4133 | 1.000 | 1.78800 | 47.4 | |
| 10 | 63.1509 | 0.812 | | | |
| 11 | 36.1905 | 6.074 | 1.80809 | 22.8 | |

TABLE 7-continued

EXAMPLE 3

| Si | Ri | Di | Ndj | vdj | Group Configuration |
|---|---|---|---|---|---|
| 12 | −38.8313 | 1.000 | 1.83481 | 42.7 | |
| 13 | 106.5971 | D13 (Variable) | | | |
| 14 (Aperture Stop) | ∞ | 1.000 | | | Group 3a |
| 15 | 33.3611 | 3.452 | 1.58267 | 46.4 | |
| 16 | −51.1306 | 0.825 | | | |
| 17 | 28.6454 | 4.234 | 1.49700 | 81.5 | |
| 18 | −31.6785 | 1.000 | 1.90366 | 31.3 | |
| 19 | 189.5823 | 2.505 | | | |
| *20 | −64.4198 | 1.500 | 1.80348 | 40.4 | Group 3b (OIS) |
| 21 | 24.3979 | 0.958 | | | |
| 22 | 26.8149 | 2.507 | 1.84661 | 23.9 | |
| 23 | 65.7196 | D23 (Variable) | | | |
| *24 | 48.9729 | 5.158 | 1.51560 | 63.1 | Group 4a |
| *25 | −43.4749 | 1.228 | | | |
| 26 | 46.7103 | 0.900 | 1.84661 | 23.9 | |
| 27 | 23.2993 | 5.972 | 1.51680 | 64.2 | |
| 28 | −50.1075 | 1.500 | | | |
| 29 | −220.7248 | 2.842 | 1.84661 | 23.9 | Group 4b (FOCUS) |
| 30 | −35.1067 | 0.500 | | | |

TABLE 7-continued

EXAMPLE 3

| Si | Ri | Di | Ndj | vdj | Group Configuration |
|---|---|---|---|---|---|
| *31 | −38.7551 | 1.500 | 1.80348 | 40.4 | |
| 32 | 52.8217 | D32 (Variable) | | | |
| 33 | ∞ | 3.700 | 1.51680 | 64.2 | GC |
| 34 | ∞ | | | | |

TABLE 8

The Distance Between Surfaces

|  | WIDE | MID | TELE |
|---|---|---|---|
| D5 | 0.985 | 31.799 | 59.360 |
| D13 | 42.441 | 18.496 | 4.134 |
| D23 | 12.593 | 6.593 | 3.931 |
| D32 | 35.488 | 66.201 | 79.500 |
| f | 18.385 | 65.000 | 229.809 |
| FNO. | 3.60 | 5.24 | 6.17 |
| 2ω [°] | 76.62 | 23.32 | 6.72 |

TABLE 9

Aspheric Surface Coefficient

| | Surface Number | | | | |
|---|---|---|---|---|---|
| | 8 | 20 | 24 | 25 | 31 |
| K | 1.764535E+00 | 1.000000E+00 | 1.000000E+00 | 1.000000E+00 | 1.000000E+00 |
| A3 | 0.000000E+00 | −7.195923E−06 | 2.236705E−05 | 1.185579E−05 | −1.209848E−05 |
| A4 | 1.957169E−06 | 1.070158E−05 | −1.776548E−05 | 7.958105E−07 | −3.809315E−07 |
| A5 | 0.000000E+00 | −6.198711E−07 | −3.149785E−07 | 2.118512E−08 | −3.235235E−07 |
| A6 | −8.921240E−09 | 2.888658E−08 | 1.876768E−07 | −1.482869E−10 | −4.325770E−09 |
| A7 | 0.000000E+00 | 2.670777E−09 | −2.501277E−08 | −6.826456E−11 | 2.597798E−09 |
| A8 | 1.686878E−11 | −8.141022E−11 | 1.241331E−09 | −5.703966E−12 | 7.572367E−11 |
| A9 | 0.000000E+00 | −1.820318E−11 | −2.966371E−13 | −2.853328E−13 | −2.605879E−11 |
| A10 | −1.069790E−13 | 4.796126E−13 | −1.372799E−12 | −3.482091E−16 | 1.078258E−12 |
| A11 | 0.000000E+00 | −4.175276E−16 | 5.242066E−17 | −5.069244E−17 | −3.590703E−16 |
| A12 | 0.000000E+00 | 6.342098E−17 | 1.419155E−17 | −1.043932E−17 | −3.359211E−17 |
| A13 | 0.000000E+00 | 1.754873E−17 | 2.199322E−18 | −1.502037E−18 | −3.043885E−18 |
| A14 | 0.000000E+00 | 2.972320E−18 | 2.865316E−19 | −1.882785E−19 | −2.673346E−19 |

TABLE 10

EXAMPLE 4

| Si | Ri | Di | Ndj | vdj | Group Configuration |
|---|---|---|---|---|---|
| 1 | 85.2753 | 1.650 | 1.84661 | 23.9 | Group 1 |
| 2 | 61.0971 | 9.580 | 1.49700 | 81.5 | |
| 3 | −13415.2421 | 0.200 | | | |
| 4 | 67.8005 | 5.262 | 1.61800 | 63.3 | |
| 5 | 180.3188 | D5 (Variable) | | | |
| 6 | 155.8827 | 1.250 | 1.88300 | 40.8 | Group 2 |
| 7 | 17.8127 | 8.428 | | | |
| *8 | −55.0274 | 0.200 | 1.52771 | 41.8 | |
| 9 | −54.1543 | 1.000 | 1.77250 | 49.6 | |
| 10 | 64.2759 | 0.752 | | | |
| 11 | 36.2797 | 5.860 | 1.80809 | 22.8 | |
| 12 | −42.0318 | 1.000 | 1.83481 | 42.7 | |
| 13 | 107.0488 | D13 (Variable) | | | |
| 14 (Aperture Stop) | ∞ | 1.000 | | | Group 3a |
| 15 | 36.9202 | 3.485 | 1.60562 | 43.7 | |
| 16 | −55.2839 | 0.418 | | | |
| 17 | 29.4841 | 4.506 | 1.49700 | 81.5 | |
| 18 | −31.6750 | 1.000 | 1.90366 | 31.3 | |
| 19 | 179.4374 | 3.027 | | | |
| 20 | −60.6876 | 2.519 | 1.80809 | 22.8 | Group 3b |
| 21 | −26.1171 | 1.021 | | | (OIS) |
| 22 | −25.1248 | 1.500 | 1.80348 | 40.4 | |
| *23 | 59.7822 | D23 (Variable) | | | |
| *24 | 50.1124 | 4.602 | 1.51560 | 63.1 | Group 4a |
| *25 | −41.5883 | 0.239 | | | |
| 26 | 44.0074 | 0.900 | 1.92286 | 20.9 | |
| 27 | 23.4843 | 6.376 | 1.57135 | 53.0 | |
| 28 | −50.4014 | 1.500 | | | |
| 29 | −214.6105 | 2.954 | 1.84661 | 23.9 | Group 4b (FOCUS) |
| 30 | −36.0530 | 0.308 | | | |
| *31 | −38.3823 | 1.500 | 1.80348 | 40.4 | |
| 32 | 51.3584 | D32 (Variable) | | | |
| 33 | ∞ | 3.700 | 1.51680 | 64.2 | GC |
| 34 | ∞ | | | | |

TABLE 11

The Distance Between Surfaces

|  | WIDE | MID | TELE |
|---|---|---|---|
| D5 | 1.088 | 34.233 | 60.339 |
| D13 | 42.437 | 19.211 | 3.556 |
| D23 | 12.727 | 6.502 | 3.377 |
| D32 | 35.498 | 66.450 | 82.397 |
| f | 18.388 | 70.021 | 266.632 |

TABLE 11-continued

The Distance Between Surfaces

|  | WIDE | MID | TELE |
|---|---|---|---|
| FNO. | 3.55 | 5.35 | 6.55 |
| 2ω [°] | 76.42 | 21.71 | 5.81 |

TABLE 12

Aspheric Surface Coefficient

| Surface Number | 8 | 23 | 24 | 25 | 31 |
|---|---|---|---|---|---|
| K  | 1.059400E+00 | −4.267237E+00 | 1.000000E+00 | 1.000000E+00 | 1.000000E+00 |
| A3 | 0.000000E+00 | 0.000000E+00 | 2.452106E−05 | 1.489020E−05 | −9.713567E−06 |
| A4 | 2.578376E−06 | −2.696768E−06 | −1.742176E−05 | 8.098620E−07 | −2.642483E−07 |
| A5 | 0.000000E+00 | 0.000000E+00 | −2.981220E−07 | 2.500170E−08 | −3.196358E−07 |
| A6 | −9.895988E−09 | −3.739540E−09 | 1.883479E−07 | 2.146275E−10 | −4.181097E−09 |
| A7 | 0.000000E+00 | 0.000000E+00 | −2.499049E−08 | −4.645454E−11 | 2.601880E−09 |
| A8 | 6.227963E−11 | 5.039709E−12 | 1.241856E−09 | −5.048669E−12 | 7.636318E−11 |
| A9 | 0.000000E+00 | 0.000000E+00 | −3.073782E−13 | −3.292470E−13 | −2.589065E−11 |
| A10 | −2.235127E−13 | 8.787654E−14 | −1.377283E−12 | −1.043005E−14 | 1.107631E−12 |

TABLE 13

EXAMPLE 5

| Si | Ri | Di | Ndj | vdj | Group Configuration |
|---|---|---|---|---|---|
| 1 | 93.4587 | 1.650 | 1.84661 | 23.9 | Group 1 |
| 2 | 64.1835 | 9.986 | 1.49700 | 81.5 |  |
| 3 | −2944.7610 | 0.200 |  |  |  |
| 4 | 65.2344 | 5.368 | 1.61800 | 63.3 |  |
| 5 | 202.0074 | D5 (Variable) |  |  |  |
| *6 | 215.5003 | 0.200 | 1.52771 | 41.8 | Group 2 |
| 7 | 153.0817 | 1.250 | 1.88300 | 40.8 |  |
| 8 | 19.6450 | 8.021 |  |  |  |
| 9 | −51.6875 | 1.000 | 1.77250 | 49.6 |  |
| 10 | 64.4660 | 0.800 |  |  |  |
| 11 | 41.5642 | 5.935 | 1.84661 | 23.9 |  |
| 12 | −41.5807 | 0.677 |  |  |  |
| 13 | −32.5792 | 1.000 | 1.72916 | 54.7 |  |
| 14 | 104.1992 | D14 (Variable) |  |  |  |
| 15 (Aperture Stop) | ∞ | 1.000 |  |  | Group 3a |
| 16 | 32.3084 | 3.914 | 1.53172 | 48.8 |  |
| 17 | −54.1732 | 0.100 |  |  |  |
| 18 | 29.6309 | 4.660 | 1.49700 | 81.5 |  |
| 19 | −35.7485 | 1.000 | 1.90366 | 31.3 |  |
| 20 | 249.1473 | 2.741 |  |  |  |
| *21 | −61.6543 | 1.500 | 1.80348 | 40.4 | Group 3b (OIS) |
| 22 | 23.7468 | 0.214 |  |  |  |
| 23 | 24.6107 | 3.104 | 1.84661 | 23.9 |  |
| 24 | 78.3524 | D24 (Variable) |  |  |  |
| *25 | 49.3602 | 4.234 | 1.51560 | 63.1 | Group 4a |
| *26 | −49.3499 | 0.200 |  |  |  |
| 27 | 43.5400 | 0.900 | 1.92286 | 20.9 |  |
| 28 | 23.8297 | 6.150 | 1.51823 | 58.9 |  |
| 29 | −56.5564 | 2.761 |  |  |  |
| 30 | 103.2763 | 1.500 | 1.80348 | 40.4 | Group 4b |
| *31 | 19.3154 | 0.199 |  |  | (FOCUS) |
| 32 | 19.2914 | 2.058 | 1.84661 | 23.9 |  |
| 33 | 32.5056 | D33 (Variable) |  |  |  |
| 34 | ∞ | 3.700 | 1.51680 | 64.2 | GC |
| 35 | ∞ |  |  |  |  |

TABLE 14

The Distance Between Surfaces

|  | WIDE | MID | TELE |
|---|---|---|---|
| D5 | 1.199 | 34.176 | 55.787 |
| D14 | 44.062 | 19.582 | 3.495 |
| D24 | 12.821 | 7.346 | 3.471 |
| D33 | 33.016 | 61.775 | 93.406 |
| f | 18.385 | 69.863 | 266.584 |
| FNO. | 3.35 | 4.82 | 6.72 |
| 2ω [°] | 76.23 | 21.67 | 5.82 |

TABLE 15

Aspheric Surface Coefficient

| | Surface Number | | | | |
|---|---|---|---|---|---|
| | 6 | 21 | 25 | 26 | 31 |
| K | 1.000000E+00 | 1.000000E+00 | 1.000000E+00 | 1.000000E+00 | 1.000000E+00 |
| A3 | 6.284305E−06 | −1.163886E−05 | 1.056290E−05 | 1.496560E−06 | 3.503030E−06 |
| A4 | 4.253083E−06 | 9.418998E−06 | −1.807183E−05 | 1.391866E−07 | −1.137710E−06 |
| A5 | −1.488286E−06 | −6.763500E−07 | −3.263778E−07 | 5.964027E−09 | 2.556320E−07 |
| A6 | 4.846455E−07 | 2.778630E−08 | 1.875944E−07 | 1.562328E−10 | 1.750823E−09 |
| A7 | −6.757543E−08 | 2.710046E−09 | −2.496865E−08 | −2.277879E−12 | −2.679950E−09 |
| A8 | 4.679181E−09 | −7.402442E−11 | 1.247873E−09 | −6.500137E−13 | −7.442581E−11 |
| A9 | −1.601948E−10 | −1.700513E−11 | 4.334404E−13 | −4.833888E−14 | 2.716024E−11 |
| A10 | 2.172743E−12 | 7.134311E−13 | −1.296464E−12 | −1.334934E−15 | −8.427644E−13 |

[Other Numerical Data of Each Example]

Table 16 collectively shows values with respect to the conditional formulas above for each Example. As can be seen from Table 16, the values of each of the Examples are within the numerical range of the respective conditional formulas (1) and (2).

TABLE 16

| Conditional Expression | Example 1 | Example 2 | Example 3 | Example 4 | Example 5 |
|---|---|---|---|---|---|
| (1) $|ft/f4b|$ | 4.04 | 4.13 | 3.53 | 4.41 | 4.07 |
| (2) $|ft/f3b|$ | 6.70 | 7.27 | 6.04 | 7.30 | 6.23 |

[Aberration Performance]

Figure 7:
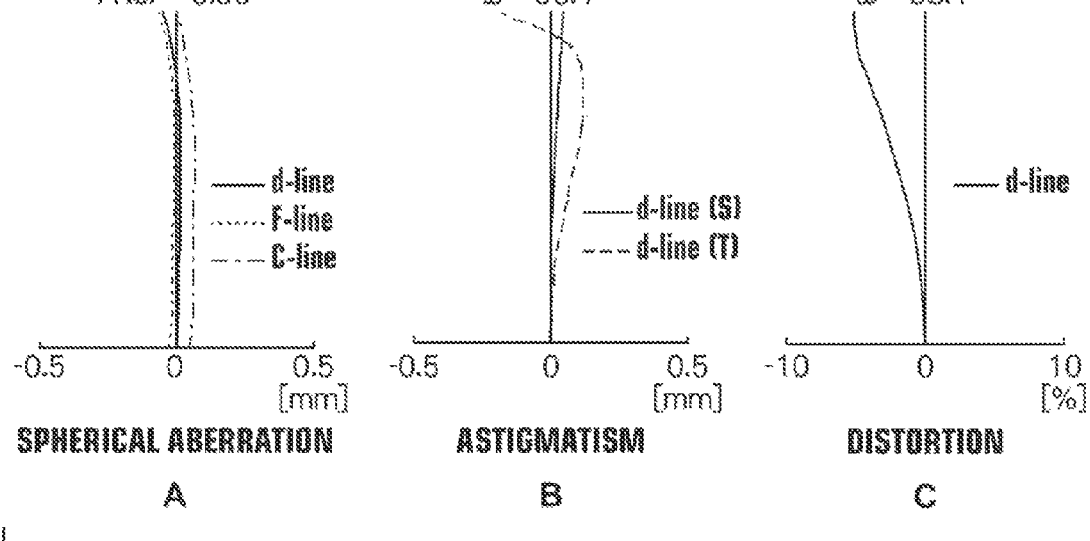
FIG. 7 is a collection of diagrams illustrating various aberrations of the zoom lens according to Example 1, which is at the wide angle end, showing A as spherical aberration, B as astigmatism, and C as distortion.
Figure 8:
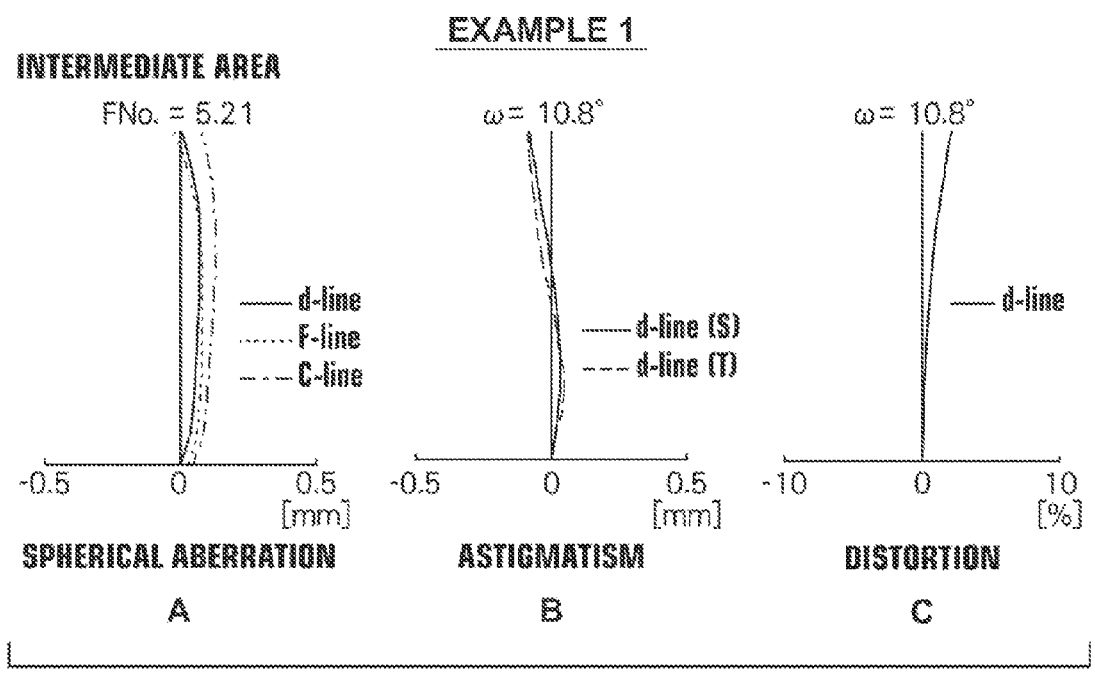
FIG. 8 is a collection of diagrams illustrating various aberrations of the zoom lens according to Example 1, which is at the intermediate range, showing A as spherical aberration, B as astigmatism, and C as distortion.
Figure 9:
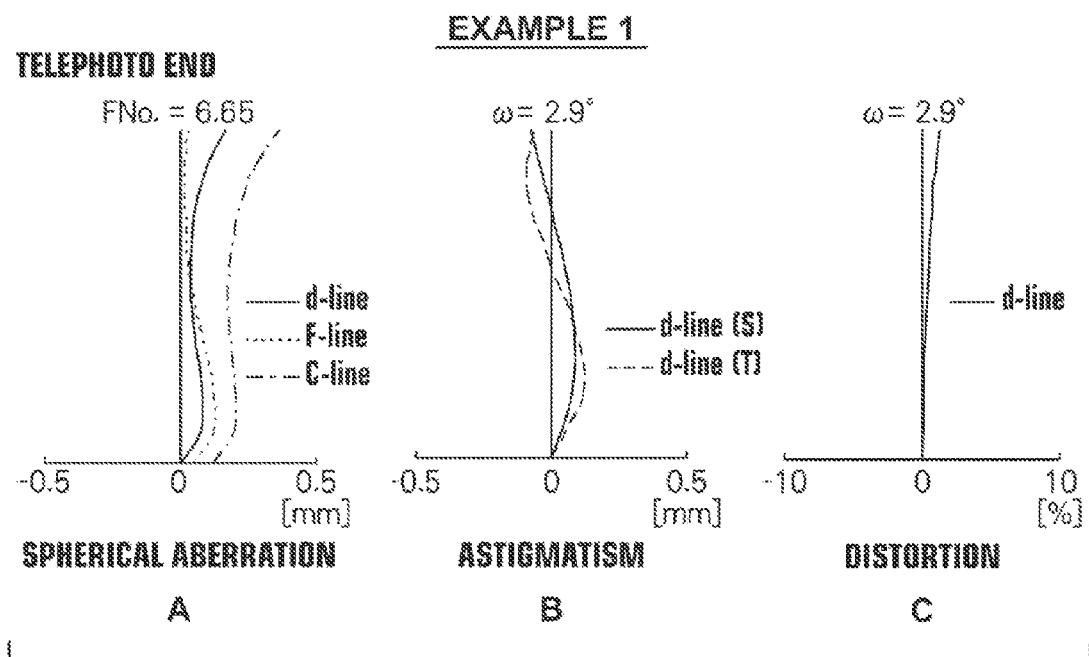
FIG. 9 is a collection of diagrams illustrating various aberrations of the zoom lens according to Example 1, which is at the telephoto end, showing A as spherical aberration, B as astigmatism, and C as distortion.

A through C of FIG. 7 respectively show spherical aberration, astigmatism, and distortion of the zoom lens according to Example 1, which is at the wide angle end. A through C of FIG. 8 respectively show the same aberrations as described above of the zoom lens, which is at the intermediate range, and A through C of FIG. 9 respectively show the same aberrations as described above of the zoom lens, which is at the telephoto end. Each of the aberration diagrams shows aberration with respect to the d-line (587.6 nm) which is the reference wavelength. The spherical aberration diagram also shows aberration with respect to a wavelength of 486.1 nm (the F-line) and aberration with respect to a wavelength of 656.3 nm (the C-line). The astigmatism diagram shows aberration in a sagittal direction with a solid line and aberration in a tangential direction with a broken line. The sign "FNO." refers to an F-number, and the sign "ω" refers to a half angle of view.

Figures 10, 11:
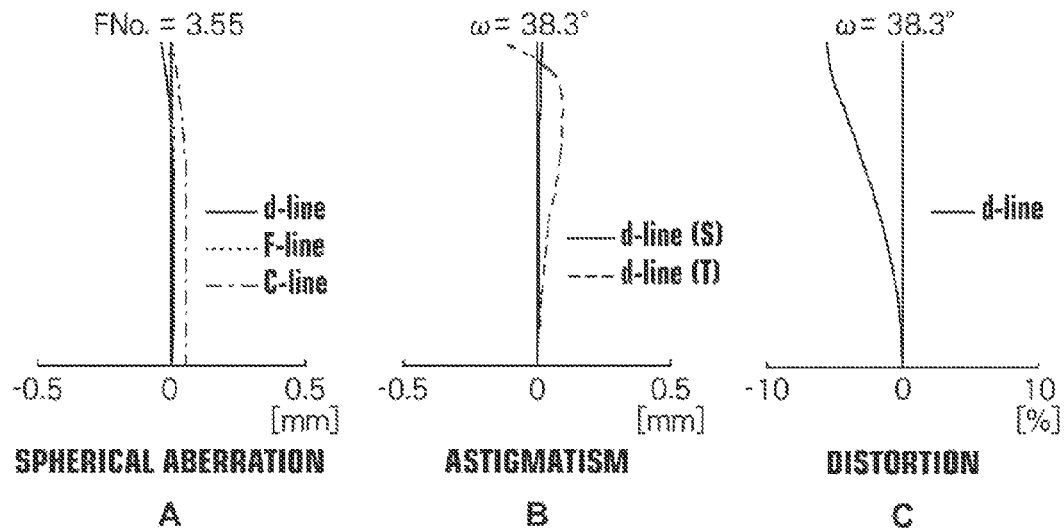
FIG. 10 is a collection of diagrams illustrating various aberrations of the zoom lens according to Example 2, which is at the wide angle end, showing A as spherical aberration, B as astigmatism, and C as distortion.
FIG. 11 is a collection of diagrams illustrating various aberrations of the zoom lens according to Example 2, which is at the intermediate range, showing A as spherical aberration, B as astigmatism, and C as distortion.
Figure 12:
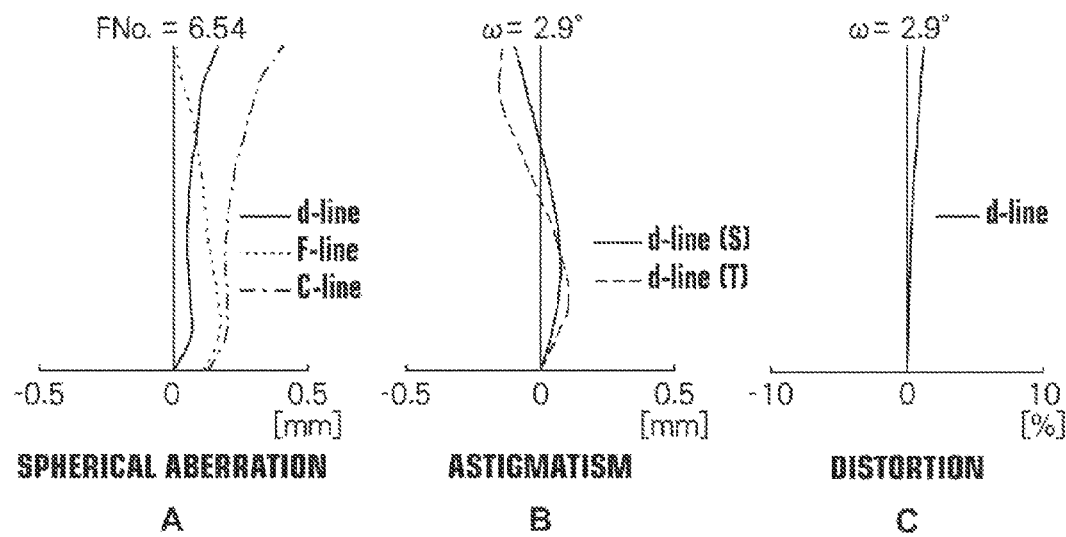
FIG. 12 is a collection of diagrams illustrating various aberrations of the zoom lens according to Example 2, which is at the telephoto end, showing A as spherical aberration, B as astigmatism, and C as distortion.
Figure 13:
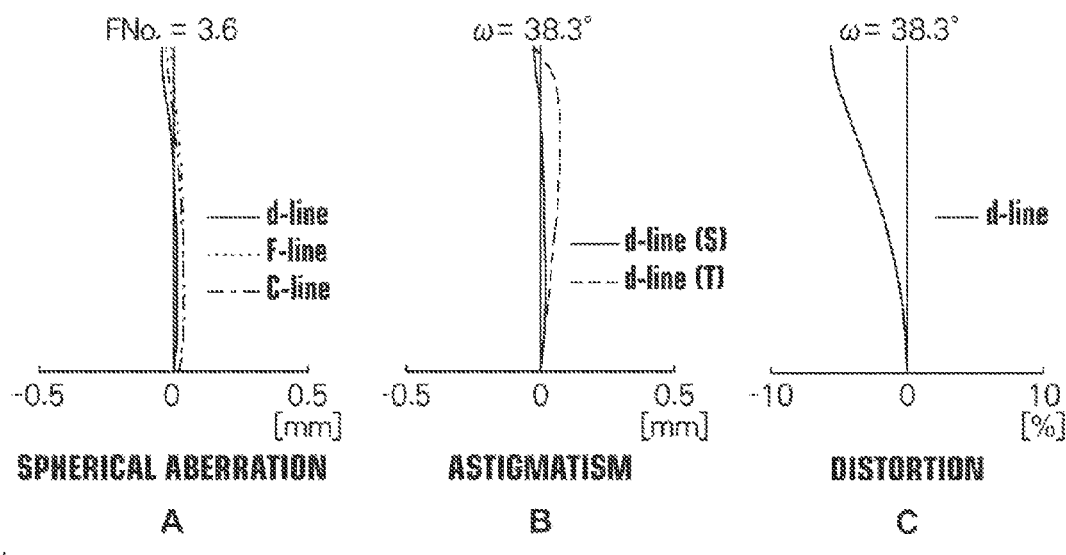
FIG. 13 is a collection of diagrams illustrating various aberrations of the zoom lens according to Example 3, which is at the wide angle end, showing A as spherical aberration, B as astigmatism, and C as distortion.
Figure 14:
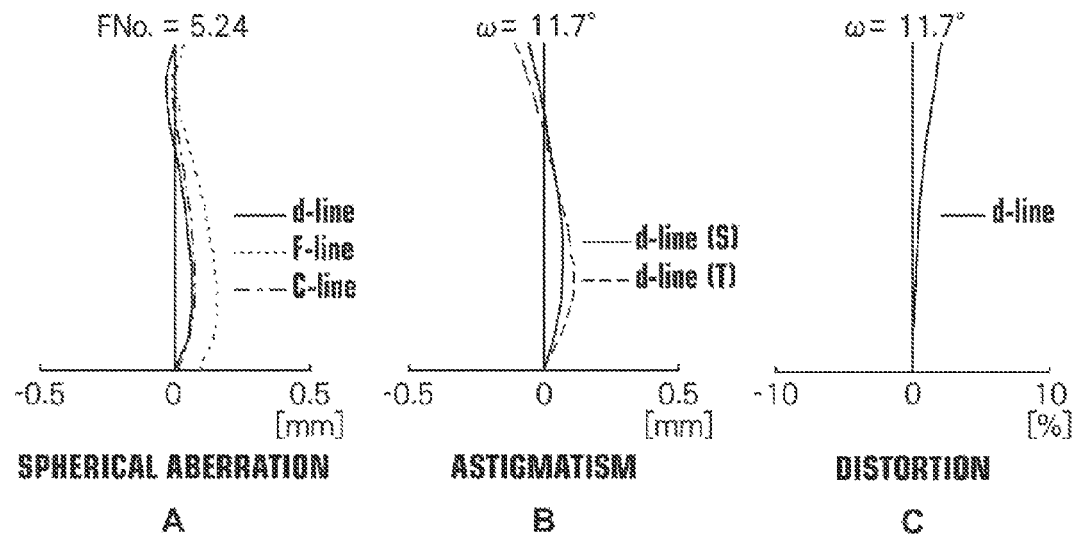
FIG. 14 is a collection of diagrams illustrating various aberrations of the zoom lens according to Example 3, which is at the intermediate range, showing A as spherical aberration, B as astigmatism, and C as distortion.
Figure 15:
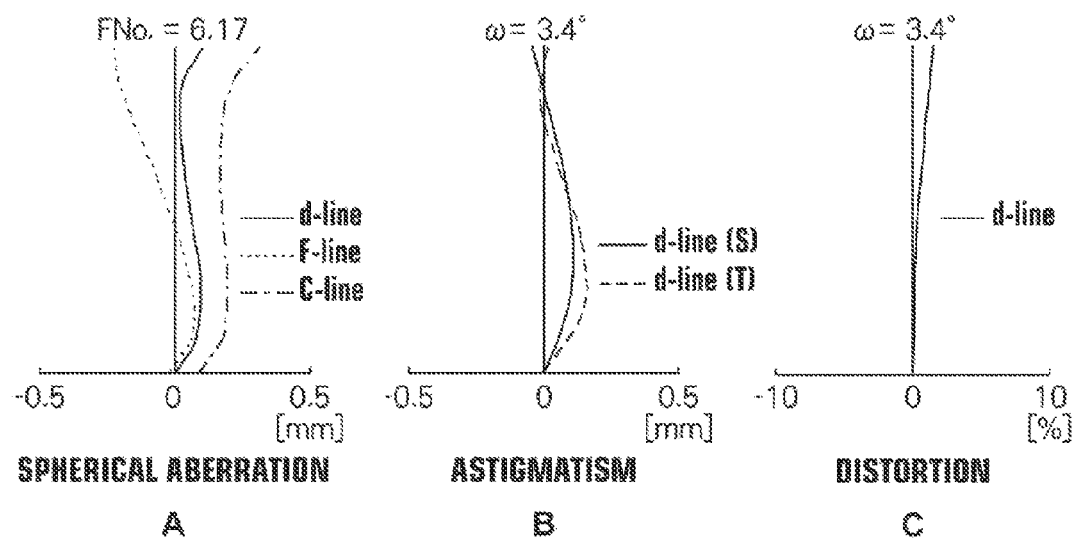
FIG. 15 is a collection of diagrams illustrating various aberrations of the zoom lens according to Example 3, which is at the telephoto end, showing A as spherical aberration, B as astigmatism, and C as distortion.
Figure 18:
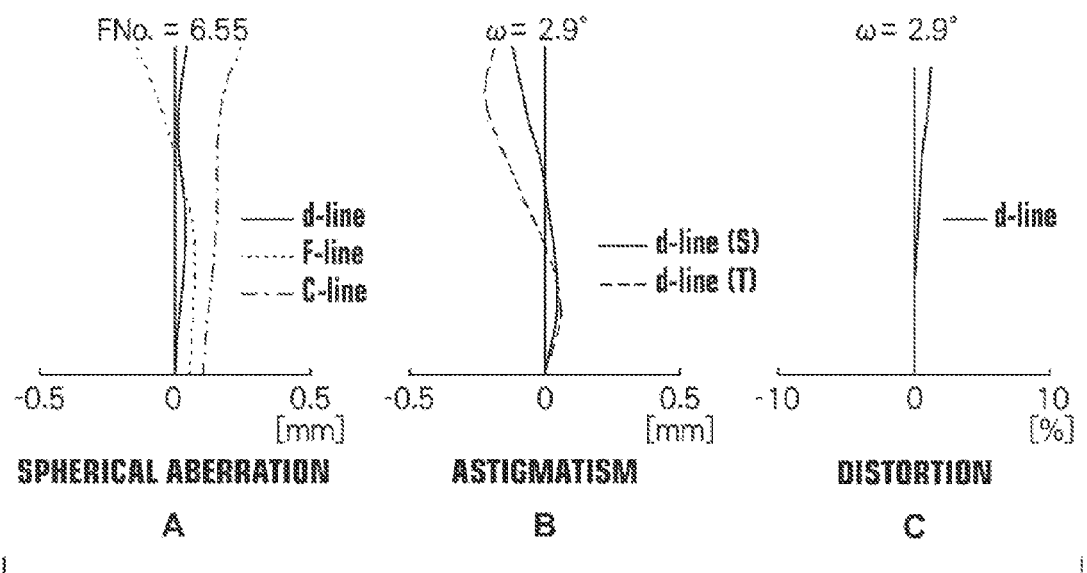
FIG. 18 is a collection of diagrams illustrating various aberrations of the zoom lens according to Example 4, which is at the telephoto end, showing (A) as spherical aberration, (B) as astigmatism, and C as distortion.
Figure 19:
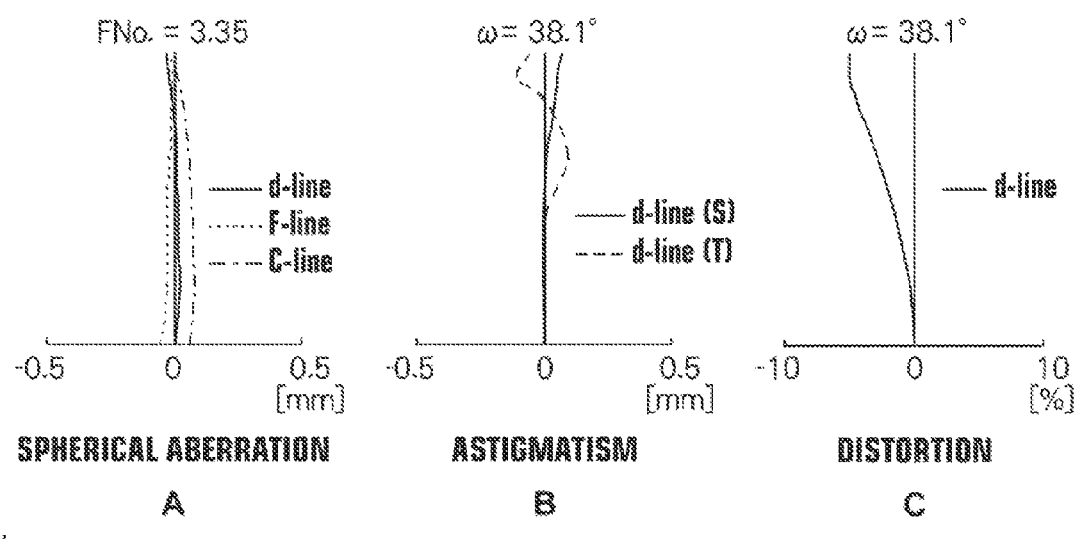
FIG. 19 is a collection of diagrams illustrating various aberrations of the zoom lens according to Example 5, which is at the wide angle end, showing A as spherical aberration, B as astigmatism, and C as distortion.

Similarly, various aberrations with respect to the zoom lens according to Example 2 are shown in A through C of FIG. 10 (at the wide angle end), in A through C of FIG. 11 (in the intermediate range), and in A through C of FIG. 12 (at the telephoto end). Similarly, various aberrations with respect to the zoom lens according to Examples 3 through 5 are shown in A through C of FIGS. 13 through 21.

As can be seen from the respective numerical value data and aberration diagrams as shown above, a zoom lens, which is miniaturized as a whole while enabling satisfactory correction of various aberrations in each range of changing magnifications and having a high zoom ratio exceeding 12, is realized.

Note that the present invention is not limited to the embodiments and the examples described above, and various modifications are possible. For example, values of the radius of curvature of each lens element, the distances between surfaces, the refractive indices, and the like are not limited to the values represented in the numerical examples shown in the Tables, but may be other values.

What is claimed is:

1. A zoom lens substantially consisting of a first lens group having positive refractive power, a second lens group having negative refractive power, a third lens group having positive refractive power, and a fourth lens group having positive refractive power in this order form the object side, wherein each of the lens groups is moved such that the distance between the first lens group and the second lens group increases, the distance between the second lens group and the third lens group decreases, and the distance between the third lens group and the fourth lens group decreases while changing magnification from the wide angle end to the telephoto end;

the fourth lens group substantially consists of a fourth-a lens group having positive refractive power and a fourth-b lens group having negative refractive power in this order from the object side, and only the fourth-b lens group is moved toward the image side while focusing from an infinity to a close distance;

the fourth-a lens group substantially consists of a 4-1st lens having a positive biconvex shape, a 4-2nd lens having a negative meniscus shape with a concave surface toward the image side, and a 4-3rd lens having a positive biconvex shape in this order from the object side; and the fourth-b lens group substantially consists of a 4-4th lens having a positive meniscus shape with a convex surface toward the image side and a 4-5th lens having a negative biconcave shape in this order from the object side.

2. The zoom lens of claim 1, wherein the third lens group substantially consists of a third-a lens group having positive refractive power and a third-b lens group having negative refractive power in this order from the object side, and a camera shake correction is performed by moving the third-b lens group in a direction perpendicular to the optical axis; and the third-b lens group substantially consists of a 3-4th lens having a negative biconcave shape and a 3-5th lens having a positive meniscus shape with a convex surface toward the object side in this order from the object side.

3. The zoom lens of claim 1, wherein conditional formula (1) below is satisfied:

$$2.5 < |ft/f4b| < 10.0 \qquad (1),$$

where
ft: the focal length of the entire system at the telephoto end
f4b: the focal length of the fourth-b lens group.

4. The zoom lens of claim 1, wherein conditional formula (1-1) below is satisfied:

$$2.5 < |ft/f4b| < 7.0 \quad (1\text{-}1),$$

where
ft: the focal length of the entire system at the telephoto end
f4b: the focal length of the fourth-b lens group.

5. The zoom lens of claim 1, wherein conditional formula (1-2) below is satisfied:

$$3.0 < |ft/f4b| < 5.0 \quad (1\text{-}2),$$

where
ft: the focal length of the entire system at the telephoto end
f4b: the focal length of the fourth-b lens group.

6. The zoom lens of claim 1, wherein at least one of the surfaces of the fourth-b lens group is an aspheric surface of a shape in which negative refractive power becomes stronger at positions further away from the optical axis.

7. The zoom lens of claim 1, wherein the third lens group substantially consists of a third-a lens group having positive refractive power and a third-b lens group having negative refractive power in this order from the object side, and conditional formula (2) below is satisfied:

$$5.0 < |ft/f3b| < 10.0 \quad (2),$$

where
ft: the focal length of the entire system at the telephoto end
f3b: the focal length of the fourth-b lens group.

8. The zoom lens of claim 1, wherein the third lens group substantially consists of a third-a lens group having positive refractive power and a third-b lens group having negative refractive power in this order from the object side, and conditional formula (2-1) below is satisfied:

$$6.0 < |ft/f3b| < 8.0 \quad (2\text{-}1),$$

where
ft: the focal length of the entire system at the telephoto end
f3b: the focal length of the fourth-b lens group.

9. The zoom lens of claim 1, wherein at least one of the surfaces in the third lens group is an aspheric surface, of a shape in which negative refractive power becomes weaker at positions further away from the optical axis within a range from half a central light beam radius to the full central light beam radius, at the telephoto end.

10. The zoom lens of claim 1, wherein the third lens group substantially consists of a third-a lens group having positive refractive power and a third-b lens group having negative refractive power in this order from the object side, and at least one of the surfaces in the third-b lens group is an aspheric surface, of a shape in which negative refractive power becomes weaker at positions further away from the optical axis within a range from half a central light beam radius to the full central light beam radius, at the telephoto end.

11. An imaging apparatus comprising the zoom lens of claim 1.

* * * * *